US010692095B2

(12) United States Patent
Wu

(10) Patent No.: US 10,692,095 B2
(45) Date of Patent: Jun. 23, 2020

(54) SYSTEMS AND METHODS OF TASK CUES

(71) Applicant: Christopher Jay Wu, Cerritos, CA (US)

(72) Inventor: Christopher Jay Wu, Cerritos, CA (US)

(*) Notice: Subject to any disclaimer, the term of this patent is extended or adjusted under 35 U.S.C. 154(b) by 276 days.

(21) Appl. No.: 15/831,122

(22) Filed: Dec. 4, 2017

(65) Prior Publication Data
US 2018/0089701 A1    Mar. 29, 2018

Related U.S. Application Data

(63) Continuation of application No. 13/169,769, filed on Jun. 27, 2011, now Pat. No. 9,836,753, which is a continuation of application No. 11/759,820, filed on Jun. 7, 2007, now Pat. No. 7,970,649.

(51) Int. Cl.
G06Q 30/00    (2012.01)
G06Q 30/02    (2012.01)

(52) U.S. Cl.
CPC ......... *G06Q 30/02* (2013.01); *G06Q 30/0226* (2013.01); *G06Q 30/0255* (2013.01); *G06Q 30/0207* (2013.01); *G06Q 30/0233* (2013.01); *Y10S 707/99936* (2013.01)

(58) Field of Classification Search
None
See application file for complete search history.

(56) References Cited

U.S. PATENT DOCUMENTS

| | | |
|---|---|---|
| 5,794,210 A | 8/1998 | Goldhaber et al. |
| 5,855,008 A | 12/1998 | Goldhaber et al. |
| 6,253,208 B1 | 6/2001 | Wittgrette et al. |
| 6,412,073 B1 | 6/2002 | Rangan |
| 6,418,424 B1 | 7/2002 | Hoffberg et al. |
| 6,487,538 B1 | 11/2002 | Gupta et al. |
| 6,766,524 B1 | 7/2004 | Matheny et al. |
| 7,072,858 B1 | 7/2006 | Litzow et al. |
| 7,149,704 B2 | 12/2006 | Martin et al. |
| 7,167,875 B2 | 1/2007 | Brown et al. |
| 7,181,438 B1 | 2/2007 | Szabo |

(Continued)

OTHER PUBLICATIONS http.//www.vibrantmedia.com/about vibrant/pressReleases/Vibrant_Media_Launches_IntelliT XT VIDEO UK.asp.

(Continued)

*Primary Examiner* — Meredith A Long
(74) *Attorney, Agent, or Firm* — Knobbe Martens Olson & Bear, LLP

(57) ABSTRACT

A computing system for encouraging the performance of a task comprises association data, a proxy module, a display module, and a reward module. The association data associates tags with stimuli related to performing tasks. The proxy module is configured to receive encoded data, to identify tags in the encoded data that have associated stimuli in the association data, and to generate modified encoded data that includes data representative of at least one of the stimuli. The display module is configured to receive the modified encoded data, to display information based at least in part on the modified encoded data, and to provide at least one mechanism for a user to perform a task related to at least one of the stimuli. The reward module is configured to reward a user for performing tasks related to the stimuli.

18 Claims, 18 Drawing Sheets

(56) References Cited

U.S. PATENT DOCUMENTS

| | | |
|---|---|---|
| 7,310,516 B1 | 12/2007 | Vacanti et al. |
| 7,415,424 B1 | 8/2008 | Donner |
| 7,451,099 B2 | 11/2008 | Henkin et al. |
| 7,512,551 B2 | 3/2009 | Postrel |
| 7,970,649 B2 | 6/2011 | Wu |
| 2001/0032182 A1 | 10/2001 | Kumar et al. |
| 2001/0034654 A1 | 10/2001 | Vigil et al. |
| 2002/0002597 A1 | 1/2002 | Morrell, Jr. |
| 2002/0188619 A1 | 12/2002 | Low |
| 2005/0086112 A1 | 4/2005 | Shkedi |
| 2005/0108092 A1 | 5/2005 | Campbell et al. |
| 2005/0149507 A1 | 7/2005 | Nye |
| 2005/0216346 A1 | 9/2005 | Kusumoto et al. |
| 2006/0200253 A1 | 9/2006 | Hoffberg et al. |
| 2006/0224452 A1 | 10/2006 | Ng |
| 2006/0271429 A1 | 11/2006 | Borgs et al. |
| 2007/0053513 A1 | 3/2007 | Hoffberg |
| 2008/0082905 A1 | 4/2008 | Martinez et al. |
| 2012/0054015 A1 | 3/2012 | Wu |

OTHER PUBLICATIONS http://www.mypoints.com/emp/u/learnMore.vm.
http://en.wikipedia.org/wiki/Microsoft_Points.
http://en.wikipedia.org/wikiXbox_Live_Marketplace.

FIG. 1

ASSOCIATION TABLE DATABASE

| TAG NAME | TEXT ASSOCIATION | OBJECT ASSOCIATION | VALUE | TASK PROGRAM | GENRE |
|---|---|---|---|---|---|
| DELL1 | Dell Computer Corp. | <none> | 8 | DELL_TASK_1 | COMPUTER |
| DELL2 | www.dell.com | <none> | 3 | DELL_TASK_1 | COMPUTER |
| DELL3 | <none> | DELL_LOGO_1 | 2 | DELL_TASK_1 | COMPUTER |
| DELL4 | DELL | <none> | 1 | DELL_TASK_2 | COMPUTER |
| APPLE1 | iPOD | <none> | 3 | iPOD_TASK_1 | ELECTRONICS |
| RHOUSE1 | Random House Inc. | <na> | 1 | RHOUSE_TASK_1 | BOOKS |
| E4C1 | Electronics 4 Cheap | <na> | 2 | E4C_TASK_1 | ELECTRONICS |

FIG. 5

USER DATABASE

| ID | NAME | ADDRESS | SEX | AGE | FEEDBACK | ACCOUNT POINTS | POINTS USED | PURCHASES | TASKS COMPLETED |
|---|---|---|---|---|---|---|---|---|---|
| USER1 | JOHN | NEW YORK | M | 45 | 0.6 | 30 | 45 | 1 | 23 |
| USER2 | JANE | VIRGINIA | F | 32 | 1.5 | 150 | 250 | 20 | 251 |
| USER3 | ADAM | CALIFORNIA | M | 20 | 0.9 | 15 | 0 | 0 | 10 |

ADVERTISER DATABASE (770)

| ID | NAME | ADDRESS | TAGS | TOTAL VALUE | TASK SELECTED | POINTS EARNED | PURCHASES | POINTS USED |
|---|---|---|---|---|---|---|---|---|
| DELL | Dell Computer | TEXAS | 50 | 250 | 1,000,000 | 1,500,000 | 50,000 | 750,000 |
| APPLE | Apple Computer | CALIFORNIA | 30 | 200 | 500,000 | 1,000,000 | 35,000 | 500,000 |
| ELEC4 | Electronic Depot | NEW YORK | 3 | 30 | 20,000 | 20,000 | 1,000 | 3,000 |

SYSTEMS AND METHODS OF TASK CUES

BACKGROUND OF THE INVENTION

Field of the Invention

Embodiments of the systems and methods described herein relate to cues for encouraging computer users to perform tasks.

Description of the Related Art

Computer and Internet-based advertising allow advertisers to target consumers in new ways not possible using traditional print or TV-based advertising. For example, Internet advertisers can collect consumers' preferences and Internet-viewing histories and can use this information to more accurately target advertisements. This accuracy benefits both consumers and advertisers. Consumers receive advertisements that are more relevant and useful to them. This, in turn, causes consumers to respond more often to an advertisement by making a purchase, thereby increasing the value of the advertisement to an advertiser.

Computer and Internet-based advertising, however, have many of the problems associated with more traditional advertising. As with other forms of advertising, only a small group of people respond to or even view computer or Internet-based advertising. Further, while computer and Internet-based advertisers can find out more information about particular users prior to placing advertisements, they do not have a complete picture of the users and their interests. Thus, computer and Internet-based advertising can be improved still further.

One challenge that computer and Internet-based advertisers face is that user interests change rapidly, making it difficult for an advertiser to reach a potential customer at the right time. For example, a user in a given demographic group may be targeted with pop-up advertisements for a new computer game based upon membership in that demographic group. However, if the viewer is using the Internet for some purpose unrelated to gaming, such as work, it is likely that the viewer is not interested in purchasing the computer game at the moment. If that viewer were to see the same advertisement at a different time, the likelihood that the viewer would buy the computer game may increase. Similarly, a discount travel advertisement might be less effective if a viewer is not already planning a vacation.

Another challenge is that a viewer's interest in a particular subject may not be obvious. For example, a viewer visiting a news website may be doing so not because he or she is typically interested in that website or matches the target demographic, but because of interest in a particular, possibly minor, element of a particular story. Because the viewer's interest is not obvious, the viewer may be presented with a number of advertisements unrelated to his or her interests.

Another challenge is that viewers tend to ignore advertisements. Ineffective targeting of advertisements increases this tendency among viewers because viewers may assume that most advertisements are not interesting or relevant to them. The typical Internet user is bombarded with extraneous information in the form of pop-up or banner ads. As a result, these users learn that information displayed at certain locations on a webpage or on a computer screen are typically advertisements, and their visual focus is not attracted to those areas. Instead of paying attention to these advertisements, Internet users tend to frequent a few familiar websites in which they know where the main content is located. From an advertiser's perspective, this means that even though many people may be visiting a webpage containing their advertisement, few are actually viewing the advertisement in a way that allows them to recognize the product or services offered. This may be true even where the advertisement contains flashing or moving images designed to grab attention.

Advertisers have attempted to counteract viewers' tendency to ignore advertisements in various ways. For example, U.S. Pat. No. 5,794,210 titled "Attention Brokerage" discusses a method for providing compensation to a user when that user decides to load an advertisement. U.S. Pat. No. 6,766,524 titled "System and Method for Encouraging Viewers to Watch Television Programs" discusses a method that seeks to reward viewers for paying attention to television advertisements. However, the foregoing systems do not adequately target the user's immediate interests and encourage them to view and respond to advertisements.

A need now exists for systems and methods that provide useful information to network users in a way that attracts their attention and increases the likelihood that they will purchase a product.

SUMMARY

Embodiments of the systems and methods described herein present visual and audio stimuli to a user in order to alert the user to a task that the user may complete. In one embodiment, a system analyzes and interprets objects in a user's field of vision. The system then determines, based upon these objects, the user's current interests. Visual and audio stimuli are generated when the user's interests correspond to some predetermined set of interests. The stimuli are presented within the user's audio or visual focus in a manner that draws attention to the stimuli while decreasing the chance that such stimuli will cause a negative reaction from the user. The stimuli are located in the user's field of vision, and preferably presented in such a way that the user is notified of their presence without substantially disturbing the user's other viewing activity.

These task cues may represent a positively valued opportunity to the user to receive information related to a current interest and at the same time gain a reward for viewing this information. When the user recognizes a task cue, the user may be rewarded for selecting the task cue and viewing the related information. If the user responds to the stimuli, then the user may perform a task that will provide information relevant to his or her current viewing activity and interests.

In one embodiment, a method presents advertisements to a user and rewards the user for displaying positive viewing behavior related to these advertisements. A system is provided for interpreting the information displayed on a user computer screen or a particular application such as a web browser. Specific tags containing advertiser information are identified within the content being viewed. Based on this information, images or sounds are generated signaling the user that advertisement content is available. The advertisement content is related to the displayed information, and therefore is made available to the user based on what the user is currently viewing. Upon choosing to view one of these related advertisements, the user may be presented with additional related tasks that encourage the user to dedicate his or her attention to the advertisement. Completing these additional tasks may result in the user being credited with reward points. These reward points may be exchanged, for example, to reduce the cost of products, services or content available for purchase. Accordingly, the user is benefited by receiving useful information and additional rewards, while the advertiser is provided with more efficient advertisements because the users are interested.

Certain embodiments allow for a paradigm shift in which the interested users select which programs a sponsor will deliver, rather than the sponsor delivering a program hoping interested users will view that program. Thus, while in previous models an advertiser may have paid a large amount of money to sponsor a program hoping to reach a certain demographic group, in certain embodiments the advertiser may sponsor a portion of a single user's viewing of a program.

According to one embodiment, the user may choose to watch a movie, listen to a song, gain access to certain software or view some other information content. In one embodiment, users can exchange reward points for access to content that was otherwise only available for purchase. Therefore, users can rent access to use certain content for a limited amount of time using their reward points. The content may be funded by requesting that the user view several advertisements related to the user's current interests, and in some cases advertisements selected by the user. By selecting and viewing the advertisements, the user is rewarded by gaining access to additional information content. Additionally, users may choose to skip these advertisements and view or use the desired content on-demand in exchange for all or a portion of the user's accumulated reward points—points possibly earned at another time and place.

According to yet another embodiment, rewards are offered for downloading and running certain programs. A software distributor may encourage users to download, install, and run a program to increase a program's popularity and allow users to become familiar with the features available. The user system may recognize tags associated with the program and inform the user of the available reward. The system may further recognize tags associated with each action the software distributor is encouraging the user to take. The user may be rewarded when these actions are taken and detected by the system.

These and other embodiments are described herein by way of example and not limitation. This Summary section provides a concise summary of some of the advantages of some embodiments described herein, and does not purport to describe every feature or characteristic of the invention. This Summary section, and the Detailed Description that follows, do not limit the invention.

BRIEF DESCRIPTION OF THE DRAWINGS

FIG. 1 is a simplified screen shot of a web search page in accordance with one embodiment.

FIG. 5 is a representation of an association table, in accordance with one embodiment.

FIG. 8 is a representation of one embodiment of data stored in a user database, in accordance with one embodiment.

FIG. 9 depicts an embodiment of an advertiser database.

DETAILED DESCRIPTION

1. Process Overview

Figure 1:
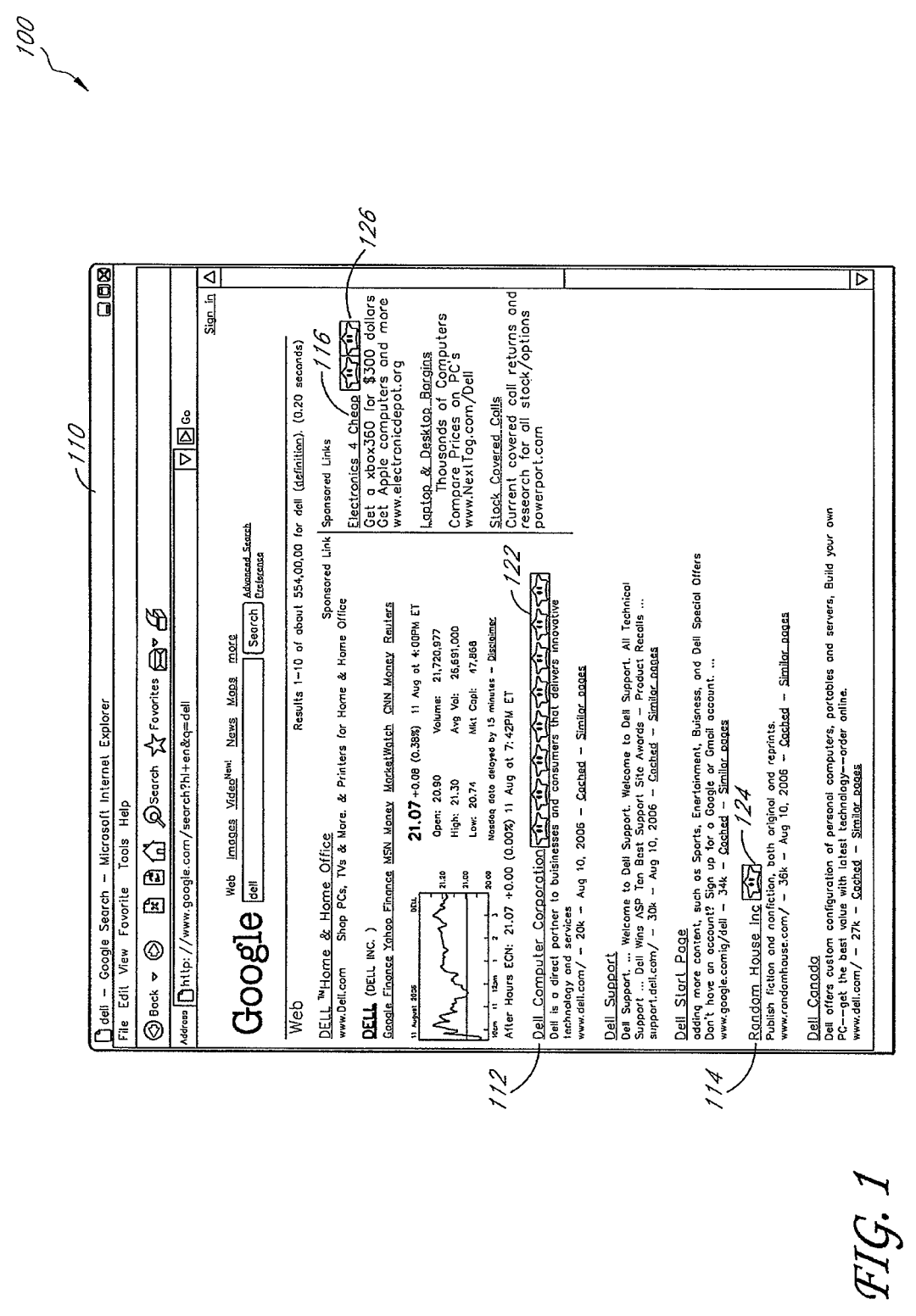
Figure 2:
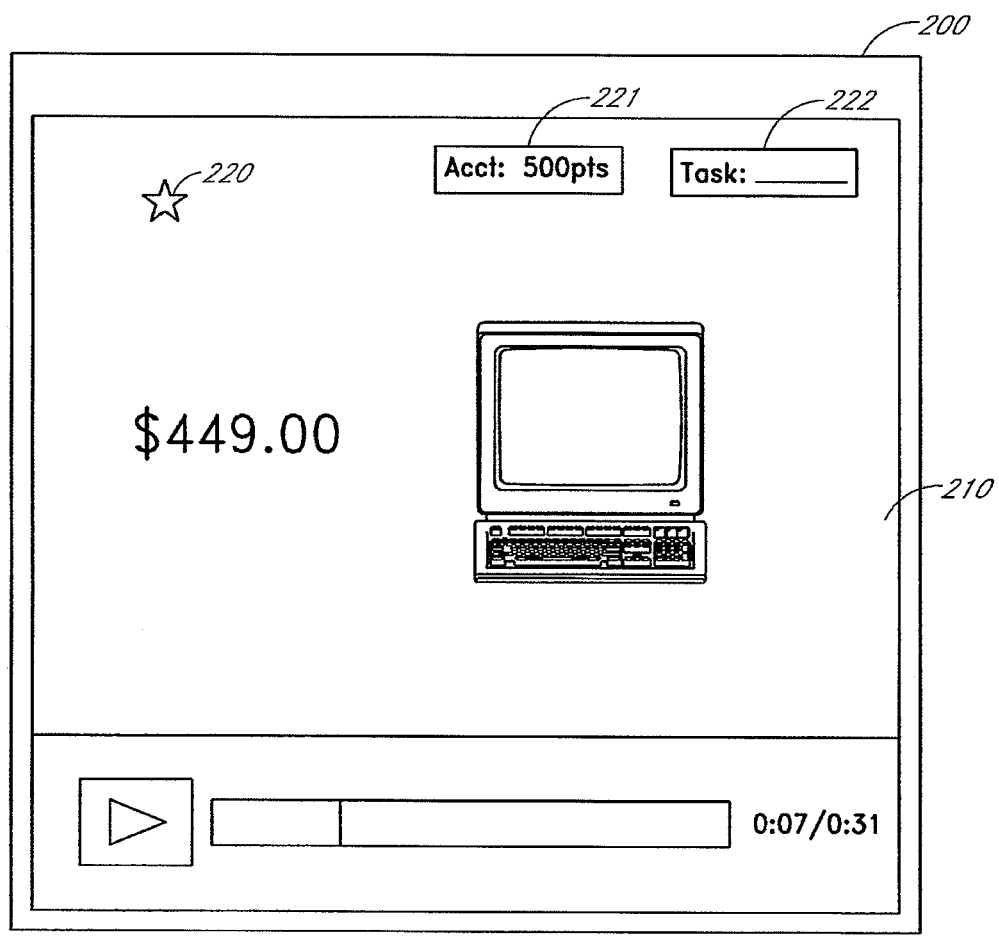
FIG. 2 is a simplified screen shot that illustrates the use of a task cue in accordance with one embodiment.

FIG. 1 shows a simplified screenshot of a web search page in accordance with one embodiment. In the illustrated embodiment, a user desktop 100 displays a web search page within a web browser 110. Specifically, as illustrated, the browser 110 displays a search engine results page generated by the Google™ search engine. The search engine results page contains entries related to the search term "Dell". For example, the results include the textual tag "Dell Computer Corporation" 112 as a hyperlink directing a user to the Dell™ Computer Corporation website.

A task cue 122 is displayed next to this hyperlink. In one embodiment, the task cue 122 comprises an image. In the illustrated example, eight stars are shown. In other embodiments, other images may be displayed to represent task cues. In one embodiment, the task cue 122 is generated based upon the occurrence of the textual tag "Dell Computer Corporation" 112. For example, the task cue 122 can be generated upon detecting the phrase "Dell Computer Corporation" in a database that associates textual tags with task cues. As illustrated, the task cue 122 has been placed near the tag 112. In one embodiment, the system places the task cue 122 near a tag 112 in accordance with placement rules. For example, as illustrated, the system may place the task cue 122 immediately to the right of the tag 112. Alternatively or additionally, the task cue 122 may be placed below, above, to the left, or over the tag 112. In one embodiment, for example, the task cue 122 comprises visually or audibly highlighting the tag 112 while still allowing the tag 112 to be read.

As described below, the placement of the task cue 122 may be accomplished by modifying the HTML data sent to a browser so as to instruct the browser to display the task cue 122 at a certain location. The modification of the HTML may be done by textually analyzing the received HTML, detecting a textual tag, and adding HTML code to position the task cue 122 in relation to the textual tag. In other embodiments, according to a graphical analysis of the display, the system may position the task cue 122 or some other content or object that results in a desirable visual association between the task cue and the tag at a location based on the relative location of the tag 112, the occurrence of white space next to the tag 112, or for some other reason.

Browser 110 further contains at least two other tags 114 and 116. These tags are also textual tags, with tag 114 corresponding to the text "Random House Inc" and tag 116 corresponding to the text "Electronics 4 Cheap." Each of these tags has a task cue 124 and 126 that has been generated near the corresponding tag. As shown, task cue 124 is represented by an image comprising a single star, and task cue 126 is represented by an image comprising two stars. Thus, the images corresponding to each of task cues 122, 124, and 126 contain eight, one, and two stars, respectively. These different images or variations on a similar image may be used to represent, for example, a value or characteristic associated with each of these task cues. In some embodiments, task cues offer a different number of points as a reward for completing a task associated with the task cue. For example, the differing images corresponding to the task cues 122, 124, and 126 may signal the number of reward points available to a user for performing the task associated with each task cue, as described in more detail below.

The task cues 122, 124, and 126 may, in some embodiments, signal to the user that the user may select one or more of the task cues to perform a task. In some embodiments, a task consists of viewing an advertisement. In certain embodiments, the user may select the task cue 122, and in response the user computer may load an advertisement to be shown on the display. For example, an advertisement may include video content and selecting the task cue loads and displays the video in a media player application installed on the user computer. In other embodiments, advertisement content is loaded in a browser to display a video, interactive content, static image, or the like. In certain embodiments, this advertisement is locked as the top layer of the user's display, so that no other applications will obstruct the user's view of the advertisement.

An example depicting such an advertisement is shown in FIG. 2, according to one embodiment. A video advertisement 210 is displayed in video player 200. Video advertisement 210 is, for example, a short video clip advertising a computer that the user may purchase. In other embodiments, an advertisement may be a static image or an interactive program, such as a Flash multimedia object. In still other embodiments, an advertisement may be an audio clip. In the embodiment shown, image overlays 221 and 222 are shown. Image overlays 221 and 222 may provide, for example, account information such as a number of reward account points available and task information such as the current task being executed.

The invention contemplates tasks that may include multiple task parts. In the embodiment shown, video advertisement 210 further includes task part 220 generated according to the current task and represented by a graphical image, for example, a star. In some embodiments, task part 220 is embedded in video advertisement 210 and video player 200 is interactive so that a user can select task part 220. In other embodiments, the image representing the task part 220 is generated according to the task by an application other than video player 200 and is displayed on a top layer of the display over the video advertisement 210. In still other embodiments, a task part image is not generated near video advertisement 210, but instead is displayed at another location on the user's screen. In these embodiments, the location may be determined dynamically, based on a set of rules, based upon a previously indicated user preference, randomly, or using any other technique known to a skilled artisan in light of this disclosure.

The generated image may signal that the user should select this image in order to complete task part 220. When the user selects the image, information may be sent over a network indicating to a remote server that the task part 220 has been completed. The remote server may contain stored data related to the user, and may update this data in response to the received information. For example, a user reward account may be incremented. In other embodiments, the task part 220 may be the first of several parts of the task, and the user computer may store information indicating which parts of the task have been completed. At that point, the user computer may transmit information to the remote server indicating which task parts have been completed, and the server may update its databases accordingly. For example, in some embodiments eight stars are displayed at various locations and at various times while an advertisement is being displayed. A task may comprise selecting each of the stars, and reward points may be accumulated based upon completed parts of this task. These reward points may be deposited when, for example, the final star is selected and therefore the last task part is completed.

Figure 3:
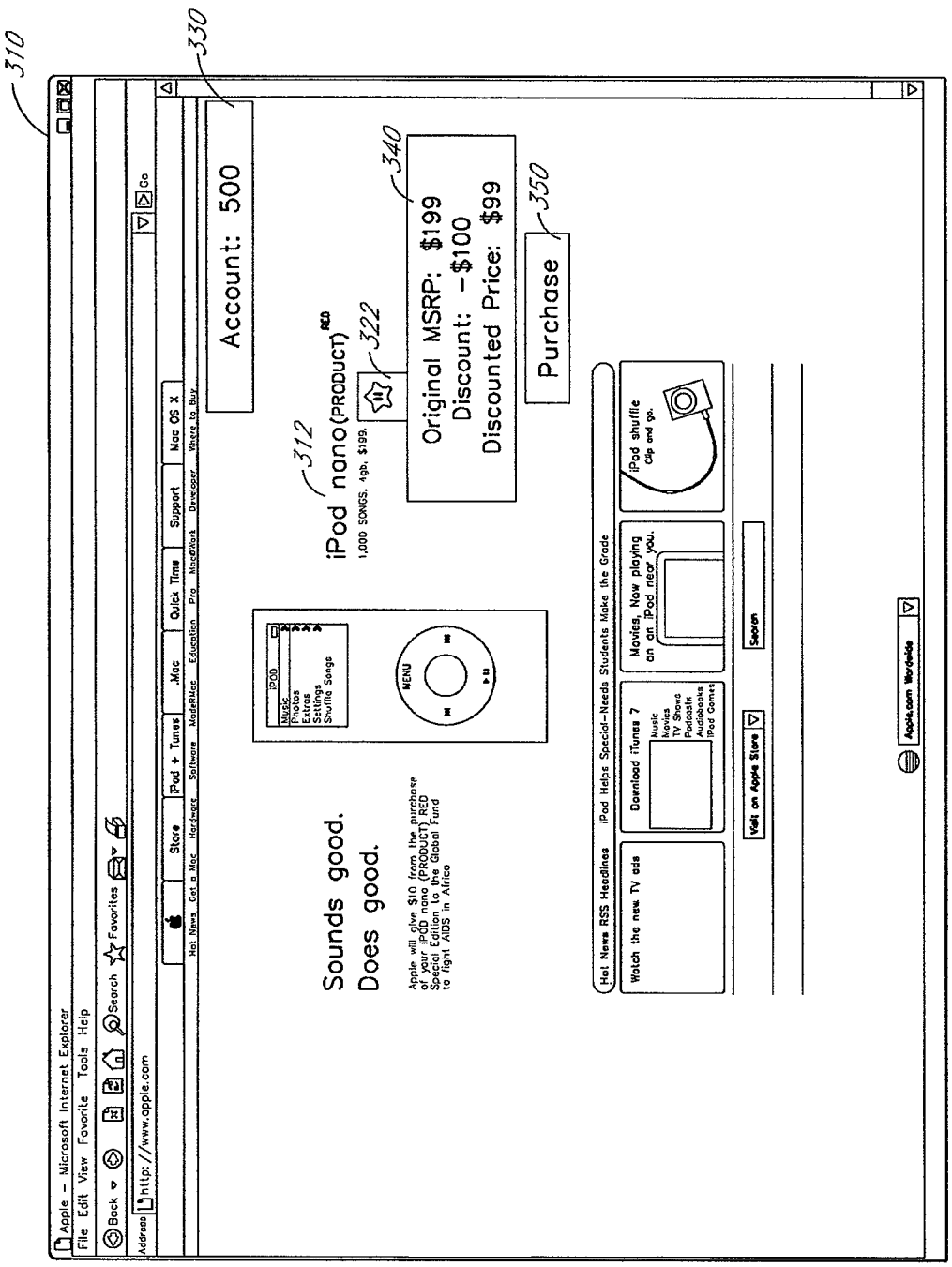
FIG. 3 is a simplified screen shot that illustrates reward redemption in accordance with one embodiment.

FIG. 3 shows a browser 310 displayed to a user according to one embodiment. The browser 310 is displaying an Apple® webpage, and includes an advertisement 312 for the iPod nano portable music player. According to one embodiment, the user computer may identify the content according to a name of an image file associated with the content or by the URL address of the webpage. The user computer may alternatively recognize this content according to a number of embodiments described in more detail below.

When the user computer recognizes that this content is being displayed, additional images are generated on the user's display. Shown in this embodiment, task cue 322, account information bar 330, transaction information bar 340, and task cue 350 are displayed. In some embodiments, each of these elements is part of a single task cue.

Task cue 322 may function to induce the user to select the image displayed on the screen. Selecting the image may, for example, cause an advertisement containing new information about the product to be displayed. In other embodiments, task cue 322 is not displayed or is not selectable.

Account information bar 330 displays a summary of the user account information. In the example shown, the account information bar 330 indicates that the user has accumulated 500 points. These points may have been acquired by completing tasks in accordance with one or more of the methods described herein.

Transaction information bar 340 displays a summary of a potential transaction, and identifies savings available to the user based in part on the user's account information. In the example shown, transaction information bar 340 first displays the manufacturer's suggested retail price (MSRP), $199. The transaction information bar 340 may next display a discount or other reward available to the user based on the points the user has accumulated in his or her account. For example, as illustrated, the user may be offered a discount such as the illustrated $100 discount. In this example, the $100 discount represents a $0.20 discount for each point the user has accumulated. A skilled artisan will appreciate, in light of this disclosure, that different discounts or rewards may be offered based on different point levels. Further, different reward sponsors may offer different rewards. For example, an airline company may offer a free round-trip ticket while an electronics company may offer discounts for consumer electronics such as televisions, DVD players, and the like.

Near the transaction information bar 340 is a task cue 350 indicating that the user may purchase the product at the discounted price by selecting the displayed image. If the user chooses to purchase the product, the user computer initiates the transaction and sends appropriate instructions to the vendor and, in some embodiments, a remote server. The remote server may then update an appropriate database in accordance with this purchase. In one embodiment, this update includes changing the available points in the account from 500 to 0. Thus, the user may exchange points earned, for example for viewing advertisements, in order to receive a reduced price on a product. In the example shown, the user is invited to use all 500 points in his account in exchange for the discount. Alternatively or additionally, the user may be given the option to use a portion of points in his or her account in exchange for a discount or other reward.

2. System Components

Figure 4:
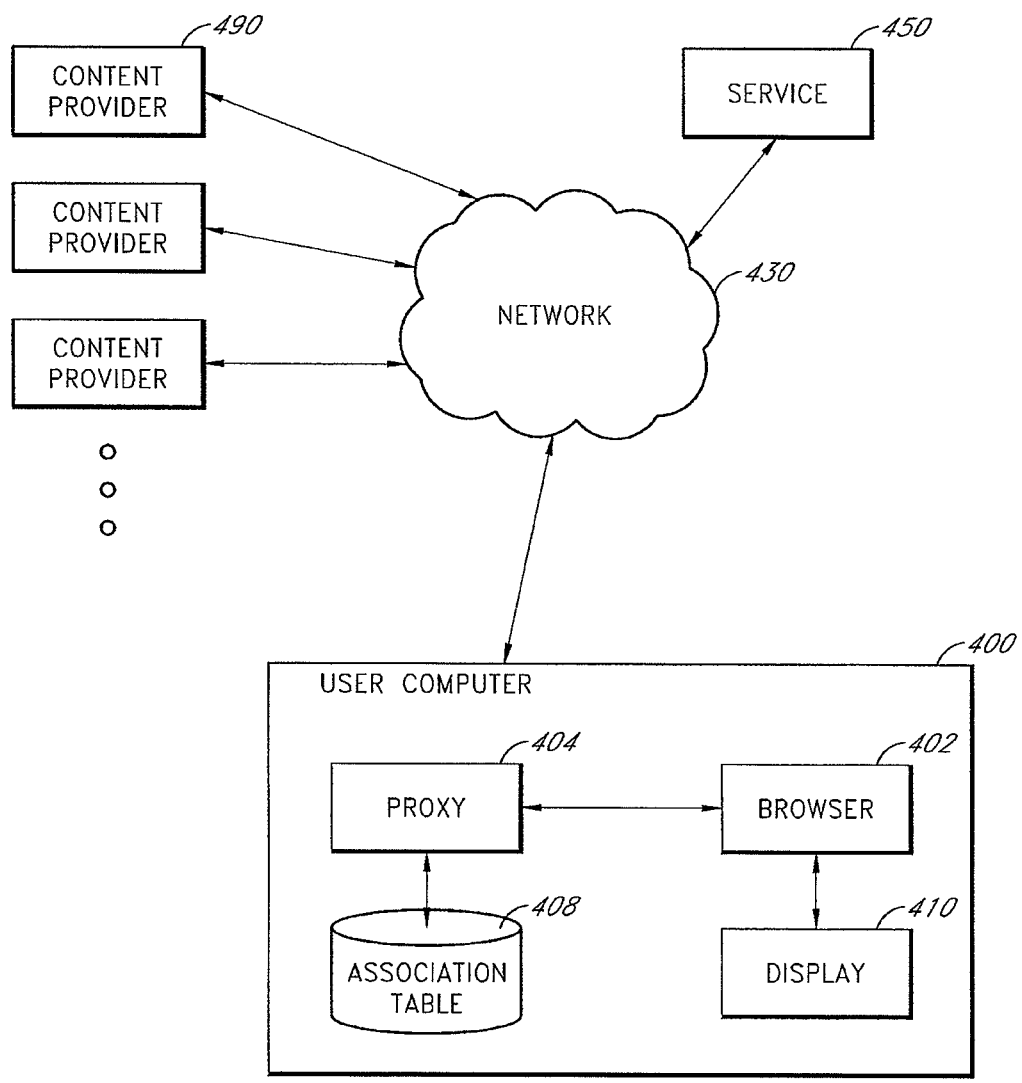
FIG. 4 is a block diagram showing an overview of one embodiment of a system of task cues.

FIG. 4 is a block diagram showing an overview of one embodiment of a system of task cues. In the embodiment shown, a network 430 is provided. Connected over the network 430 are a user computer 400, a service 450, and a number of content providers 490.

User computer 400 may be, for example, a personal computer or notebook computer. In other embodiments, user computer 400 may comprise a server, a handheld computing device such as a personal digital assistant, a cellular phone, a television receiver having processing capabilities such as a web TV or Apple® TV, or any other device capable of executing instructions for implementing or carrying out the systems or functions described herein.

According to one embodiment, several components of user computer 400 are shown in FIG. 4. User computer 400 comprises a browser 402, a proxy 404, an association table 408, and a display 410. While these components are connected to or stored on user computer 400 in the embodiment shown, it will be understood that these components, or portions thereof, may be located or stored remotely to the user computer 400. For example, association table 408 may be stored by service 450, and user computer 400 may access this information over the network 430. In other embodiments, content provider 490 or some other remote server stores some or all of these components. Furthermore, some of the components are generally described as being implemented by software instructions stored in a memory of user computer 400. However, in other embodiments, some of the functions of these components may be implemented as application specific circuitry. A skilled artisan will appreciate, in light of this disclosure, that any functions implemented in software can generally be implemented in hardware, firmware, or a combination of software, hardware, and firmware. Accordingly, any software implementation described herein can also be implemented in any combination of software, hardware, and firmware.

Browser 402 may be any browser application such as Internet Explorer or Firefox browsers. In ordinary operation, browser 402 transmits requests, instructions, and other data to remote sites over the network 430 and receives data from remote sites over the network 430. Based on that data, browser 402 displays information to the user. The browser 402 generally formats the information and displays it to the user in accordance with a formatting language such as HTML, XML, or the like. Any suitable formatting language or code for representing information to be displayed can be used. Further, while a browser 402 is advantageous for displaying information received over the World Wide Web, a skilled artisan will appreciate that any other application that is suitable for displaying information may be used.

In one embodiment, proxy 404 is a software program that acts as a proxy network browser between browser 402 and the network 430. Thus, proxy 404 receives data sent by the browser 402 and forwards that data to the appropriate remote site through the network 430. Proxy 404 may additionally modify this data or generate additional data to send to remote sites. Proxy 404 also receives data sent over the network 430 intended for browser 402.

In other embodiments, proxy 404 may be an embedded, add-on, or extension software module of browser 402. For example, proxy 404 may be implemented in certain embodiments as an extension in a Firefox browser. In other embodiments, a user may access a remote server using browser 402 and interface with a proxy application 404 running on that server.

Other embodiments may utilize applications other than an Internet browser, such as a word processor, media program, a custom software application, or the like. In embodiments utilizing other applications, these applications may also transmit and receive data over the network 430. For example, a media program may transmit information associated with a media file to verify licensing information or to download related information such as an album cover.

In some embodiments, proxy 404 modifies the data intended for browser 402 and forwards the modified data on to browser 402, so that the user computer 400 will display additional content. In one embodiment, this additional content comprises task cues. In order to determine when a task cue or other additional content should be displayed, and what content to display, an association table 408 is stored on the user computer according to certain embodiments. In some embodiments, association table 408, or content to be stored therein, is downloaded from service 450 over the network 430. In other embodiments, association table 408 is accessed remotely by user computer 400 but stored on service 450 or some other server connected to network 430. In preferred embodiments, association table 408 is updated regularly, such as once each day, week, or month.

In a typical embodiment, association table 408 may contain a number of tags along with information related to each of the tags. The proxy 404 may read the tags from association table 408 and determines if the data being transmitted over the network and intended for browser 402 contains data representing all or a part of one or more of these tags. If one or more of the tags is found in the data being transmitted to browser 402, then proxy 404 may insert a task cue. Information associated with the appropriate tag in the association table 408 indicates the task cue that should be displayed.

A representation of an association table 408 is shown in FIG. 5, in accordance with one embodiment. As previously mentioned, association table 408 contains information related to various tags in certain embodiments. For example, association table 408 stores data relating to a tag name 502, a text association 504, an object association 506, a value 508, a task program 510, and a genre 512. A tag name 502 may be used to identify the tag, and may not be necessary when, for example, a tag is identified by either the text association 504 or object association 506. The information stored in the illustrative association table of FIG. 5 is shown by way of illustration and not limitation. A skilled artisan will appreciate, in light of this disclosure, that some of the illustrated information may be omitted and that other information may be stored in an association table.

A text association 504 represents a string of text that may be compared to data to be displayed on the display 410 to determine the existence of a tag on the user display. In some embodiments, the text association 504 is the string compared. In other embodiments, the text association 504 directs a user or application accessing the association table 408 to a file including the string. In these embodiments, the file containing the string may further comprise other information such as formatting data, alternative strings, wildcard characters, or the like. In addition to wildcard characters—e.g. a '*' representing any number of any characters, a '!' representing any single character—other information indicating matching conditions may be included such as, for example, logical operators like "and" or "or" or "not" may separate text sequences to represent sophisticated text patterns that may result in matches.

An object association 506 may be utilized to similarly determine the existence of an object such as an image, audio clip, or other stimuli. For example, the object association 507, here "DELL_LOGO_1," may represent a Dell™ logo image, and it may be detected by recognizing an HTML instruction loading an image having that title, by visual analysis of the display screen and comparison to the logo image, or by some other means. In some embodiments, the object association 506 indicates the actual media or other file. In other embodiments, the object association 506 indicates a file including a reference to a stored location of a media file and additional information. Such information may comprise, for example, meta data associated with the object association, additional media files, or the like.

Association table 408 is shown storing both text associations 504 and object associations 506. In this example, a tag name is associated with either a text or object association. In other embodiments, both text associations and object associations may be associated with a single tag name. In still other embodiments, only one of text associations and object associations are stored in association table 408. In some embodiments, text associations are stored as object associations.

Association table 408 further comprises a value 508 associated with each tag. The value 508 may be used in some embodiments to allow the system to determine the relative value of the reward offered for completing the task associated with the task cue. This value may be represented by the image displayed for a task cue to inform the user of the available reward amount. An example of this is shown with reference to FIG. 1, where task cues 122, 124, and 126 each comprise images showing a different number of stars. These images may be determined, for example, by generating a number of stars that corresponds to the value 508 associated with that tag in association table 408. In other embodiments, different images or other variations in an image, such as color or size, are used to indicate the value 508. In still other embodiments, the value is not used in determining the image displayed for a task cue. In those embodiments, all task cues may be displayed identically or according to some other rule. For example, a task cue image may be a logo image of a company associated with the tag.

Association table 408 also includes a task program 510 associated with each tag. Task program 510 may be used to instruct the user computer 400 on which task to execute if the user selects the associated task cue. For example, the task program 510 may indicate a program to be downloaded and executed from service 450. In other embodiments, the task program 510 may indicate an application stored on user computer 400. In some embodiments, association table 408 may further include a hierarchy of task programs, and a user may only complete each task program once. In these embodiments, proxy 404 may select a first task program according to the stored hierarchy of an association table 408 if that task program is available, and a second task program according to the stored hierarchy if the first task program has already been completed. Larger hierarchies may be utilized in the same way. In other embodiments, a user may complete a task program an unlimited or predetermined number of times. In still other embodiments, a user may repeat a given task program and earn rewards for task parts not previously completed.

In one embodiment a task program comprises a set of instructions that defines one or more tasks to be performed. A task program may, for example, be encoded in a computer language such as C, C++, or the like. Alternatively or additionally, a task program may be encoded in a scripting language, a macro language, or any other encoding known to a skilled artisan. Preferably, the task program includes logic, such as if-then-else statements or similar branching operations, that provide for flexibility in the steps that are executed by a task program. In addition to defining what must occur for a task to be performed, a task program may include encoded task completion conditions that are used to determine whether a user successfully completes a task.

Proxy 404 further determines where the task cue is displayed in some embodiments. For example, proxy 404 may determine the location of the tag when it is displayed, and place a task cue near this location. In other embodiments, proxy 404 locates the task cue at a predetermined position, such as at the top of a browser window. In still other embodiments, the location of the task cue is determined in part based upon information related to the tag in the association table 408. In other embodiments, at least part of the task cue comprises a non-visual signal such as an audio signal, and proxy 404 is configured to generate the appropriate signal.

Figure 6:
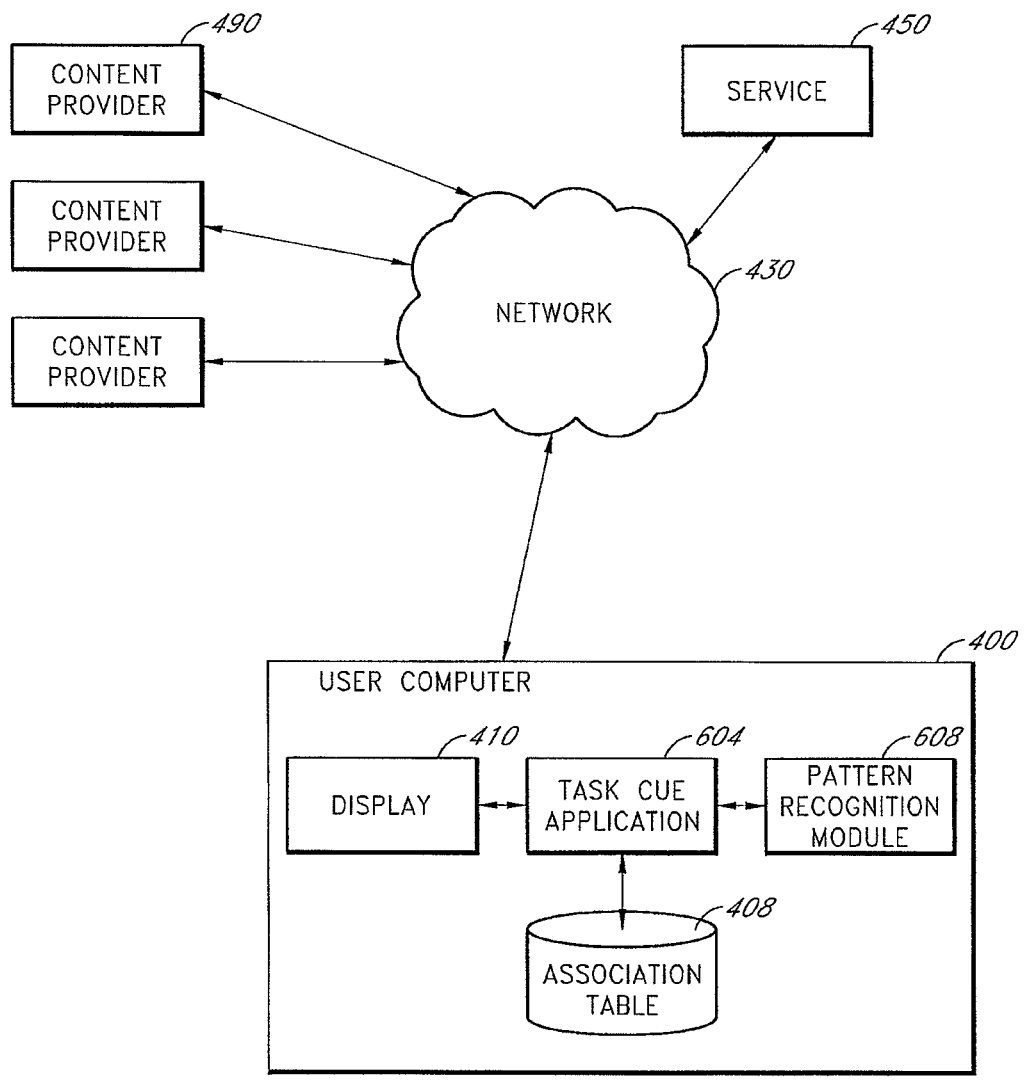
FIG. 6 is a block diagram showing an alternative embodiment of a system of task cues.

User computer 400 further includes a display 410. Display 410 may be any device for providing information to a user, such as an LCD screen, CRT screen, plasma display, or the like. In other embodiments, display 410 may actually be non-visual output devices such as audio speakers or the like A simplified block diagram of a different embodiment is shown in FIG. 6. In this embodiment, the system again contains user computer 400, service 450, content providers 490, and a network 430. However, in this embodiment user computer 400 includes several different components in order to interpret and modify the visual, audio, and other stimuli provided to a user.

In the embodiment shown, user computer 400 comprises a display 410, a task cue application 604, a pattern recognition module 608, and association table 408. Display 410 is shown and examples are given describing embodiments manipulating the images displayed on screen 410, but these descriptions are for the purpose of providing an example only, and are not limiting. It will be understood that the concepts described can be applied to audio data, mechanical control data, or other data without departing from the scope or spirit of the present invention.

Display 410 operates to display information to a user based on any software currently executing on the user computer 400. For example, display 410 may display images of a webpage, a word processing document, a file system, or any other information.

Task cue application 604 may be, for example, a software program running on user computer 400. Task cue application 604 may appear to be minimized or may be otherwise unnoticed by a user until triggered. Task cue application 604 reads data being displayed and is triggered by the detection of a tag or by input from the end-user of computer 400. At that point, task cue application 604 either modifies the images being shown on display 410 or causes new images to be shown. In some embodiments, task cue application 400 may generate a normally transparent window that is locked to the top layer of the screen. Task cues and other images may be generated in this window to appear near other content displayed on the screen.

Tags are identified by task cue application 604 by comparison to tags in association table 408. Association table 408 contains a list of these tags, along with information associated with each of the tags. For example, FIG. 5 shows a representation of an association table 408 including several tags. As shown, some tags are text objects, such as tag 112, in this case "Dell Computer Corp." Other tags may be files such as media files, image files, audio clips, or the like. For example, tag 507 is "DELL_LOGO_1." In the embodiment shown, tag 507 is an image file, such as a .GIF or .JPG file, which is a representation of the Dell™ logo.

Pattern recognition module 608 compares these tags to the visual information on the display 410. In some embodiments, pattern recognition module 608 may be implemented as an optical character recognition (OCR) module. In these embodiments, pattern recognition module 608 may acquire a screenshot using, for example, built-in operating system commands of user computer 400. Pattern recognition module 608 may load and interpret this screenshot. In some embodiments, pattern recognition module 608 utilizes an OCR program installed on user computer 400 and calls this application to identify the text on display 410. Accordingly, pattern recognition module 608 may identify the text shown on display 410. This identified text may be compared with textual tags in association table 408 to see if any of the tags are displayed. In other embodiments, pattern recognition module 608 also recognizes visual patterns. For example, pattern recognition module 608 may be configured to compare images on display 410 to tag images such as corporate logos. In some embodiments, a pixel compare algorithm may be utilized to identify visual images. In other embodiments, image analysis may include recognition of patterns despite variations in scale, color, or the like.

If screenshots are utilized, they may be acquired and analyzed at intervals determined to maximize performance. For example, screenshots may be analyzed less than once per second. In other embodiments screenshots are analyzed every five seconds. In general, as the time interval between screenshots decreases, the ability of the task cue application 604 to generate images accurately on display 410 relative to the content being viewed by the user increases. When the time interval between screenshots increases, the delay between the user viewing the content and the display of generated images may allow the user to move or hide the content on display 410 so that the generated images are misplaced. For example, if a user scrolls down in an Internet browser between the time the screenshot is analyzed and the time when an additional image is displayed, the image may not appear close to the corresponding tag. Thus, it is generally preferable to have intervals of less than one second. However, when the processing power of the user computer 400 or the complexity of the operations being performed does not allow for small intervals, task cue application may compensate by, for example, placing all of the generated images in a predetermined location on display 410 so that the images do not appear out of place.

As described above, these embodiments have been described with reference to a visual display. However, in other embodiments, audio and other stimuli provided to a user by user computer 400 are analyzed in similar fashion. For example, a software or hardware module may act as an intermediary between a processor or sound card of the user computer 400 and an audio output. This module may recognize certain series of tones, such as a ring tone or the first few notes of a song, and may induce task cue application 604 to generate a task cue when one of those tones is recognized.

Figure 7:
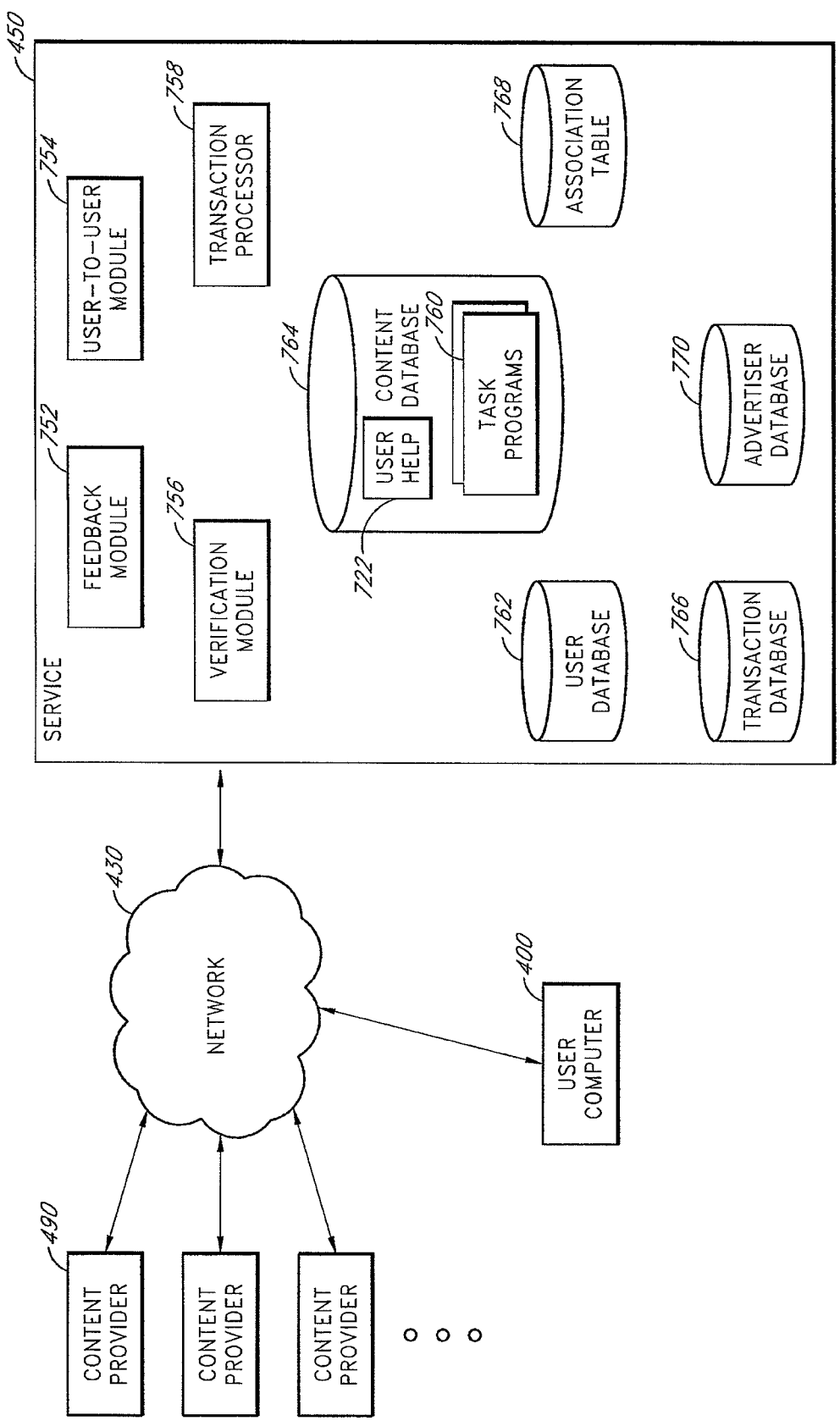
FIG. 7 is a block diagram that illustrates one embodiment of a task cue system.

FIG. 7 is a block diagram that illustrates one embodiment of a task cue system. FIG. 7 includes an expanded view of several components of service 450 according to this embodiment. In certain embodiments, service 450 may be a web server or the like. In some embodiments, service 450 may comprise multiple distributed servers.

In the embodiment shown, service 450 comprises feedback module 752, user-to-user module 754, verification module 756, and transaction processor 758. Verification module 756 is used to authenticate operations requested by either a user computer 400 or by a content provider 490. Verification module 756 may utilize any authentication process known in the art and may utilize information stored both locally on service 450 and remotely by a user computer 400 or a content provider 490 in order to authenticate instructions. For example, verification module 756 may access user database 762 in order to associate a user ID and password. Verification module 756 may further control access to certain data stored by service 450, and may allow different users access to different data.

Transaction processor 758 updates the databases of service 450 in response to commands received from user computer 400 and content providers 490. For example, a user computer may indicate to service 450 that the user has performed a task, and transaction processor 758 may therefore update the user database 762, advertiser database 770, and the transaction database 766. Transaction processor 758 may access association table 768, and may utilize feedback module 752, in determining how to update each database.

As will be described in more detail below, user-to-user module 754 performs operations associated with connecting a user computer 400 requesting assistance with one or more other remote users connected to network 430. For example, a user computer 400 may send data including a request for assistance and information relating to that request to service 450. User-to-user module 754 may format and broadcast that data to remote users. User-to-user module may further receive data corresponding to help requests from the remote users and transmit the information in those requests to user computer 400. In some embodiments, user-to-user module 754 may further assist in the communication between a first user and a remote user. User-to-user module 754 may further update user database 762 and transaction database 766 in response to this information.

As will be described in more detail below, feedback module 752 may access user database 762 in order to obtain information related to each user. Feedback module 752 may use this information to determine a feedback score, and may provide that score to user database 762.

The databases shown in this embodiment comprise user database 762, content database 764, association table 768, transaction database 766, advertiser database 770, and user help database 772.

A representation of one embodiment of the data stored in user database 762 is shown in FIG. 8. The user database 762 includes a number of different fields identifying different users and account information associated with that user. Each user account has an ID 801, a name 802, demographic information 803, an account value 805, a number of points used 806, a record of the number of purchases made 807, a record of the number of tasks completed by the user 808, and a feedback score 804. In other embodiments some of these fields are not necessary and are not stored by user database 762. In other embodiments, additional fields are stored by user database 762.

User ID 801 may be used, for example, to uniquely identify the user account. User name 802 may further personally identify the user by their given name. In the example shown, the first names 'John', 'Jane', and 'Adam' are shown corresponding to 'USER1', 'USER2', and 'USER3' respectively. In other embodiments, full names may be used. In still other embodiments, a password may be associated with a user ID 801 or name 802. In embodiments in which a password is used, the password may be encrypted and stored in user database 762 according to known encryption methods. In other embodiments only one of a user ID 801 or name 802 are stored in user database 762.

Demographic data 803 comprises, in the example shown, address field 811, a sex field 812, and an age field 813. This information may be used in certain embodiments in order to identify relevant information about a user and to sort users. For example, this information may be used in scoring different task cues in order to determine which task cues to display to the user when multiple task cues are presented. In other embodiments, this information is used to target other information to a user. In still other embodiments, other demographic information is included. For example, relationship status, living situation (e.g., does the user live in an apartment, or own their home), credit rating, or the like, if known. In some embodiments information is obtained voluntarily from the user when they sign up for the service. In other embodiments, information may be collected in other ways. In certain embodiments, only some of the information is available for each user.

Account value 805 has a current value of the user account which is equal to the number of total points earned, less the number of points used. For example, user 'John' has 30 points in his account which may be used, for example, to reduce the cost of a product, service, or content provided by a content provider 490. The points used field 806 represents the total number of points that have been spent by the user so far. The purchases field 807 represents the number of goods the user has purchased using the service and thus where their points have been used. For example, user 'John' has made 1 purchase, and therefore has used 45 points on that purchase to reduce the purchase price. The number of tasks completed 808 is a representation of how many tasks or task parts have been completed by a user. Feedback score 804 is a representation of the overall behavior of a user. In general, a higher feedback score represents positive behavior from the perspective of service 450. This higher feedback score may represent the ability of a user to earn more points than normally offered for completing tasks or task parts.

Other information may additionally be stored in user database 762. For example, user database 762 may include more detailed information about points earned from specific vendors, and whether those points are used with those vendors.

Example content of an advertiser database 770 is shown in FIG. 9, according to one embodiment. While a number of fields 901-909 are shown, it will be understood that in other embodiments different fields and different information may be stored by advertiser database 770. In the embodiment shown, the advertiser database 770 comprises ID field 901, a name field 902, an address field 903, tags field 904, total value field 905, tasks selected field 906, points earned field 907, a purchases field 908, and a points used field 909.

ID field 901 may contain any unique identifier of a content provider 490. For example, "DELL" is the identifier of the content provider Dell™ Computer Corp., whose name is listed in field 902. In some embodiments, the ID field and name field comprise a single field. That is, only one of the fields is used to identify a content provider. In some embodiments a password field may additionally be used and associated with an ID 901 or name field 902 and may be used to authenticate a content provider when accessing certain information and programs of service 450.

Address field 903 is the location of the content provider. For example, Dell™ Computer Corp. is located in Texas and Apple® is located in California. While a state is shown identifying a location, it will be understood that more specific information may be stored in advertiser database 770. For example, street address and other contact information such as a phone number, e-mail address, or the like may be stored in advertiser database 770.

Tags field 904 is additionally stored in advertiser database 770. For example, Dell™ Computer Corp. has 50 tags corresponding to content in the embodiment shown. As discussed above, a tag may be anything such as a text, video, or audio file, usually related to that corporation, and that is identified according to the system and method described herein to generate a task cue associated with that content. In certain embodiments, the value of the tags field 904 for a content provider will correspond approximately to the number of tags stored in Association table 768 on service 450 and association table 408 on user computer 400 that are associated with that specific content provider.

Total value field 905 is additionally stored in advertiser database 770 in some embodiments. Total value field 905 may, for example, store the total number of value points associated with each of the tags owned by a single content provider. For example, Dell™ Computer Corp. has 250 total value points. This may be reflected in each of the fifty tags having a value of five. Having a higher value may correspond to receiving a higher score so that a tag is more likely to be displayed by a user computer. For example, in some embodiments, when more than one tag is located on a user display 410 at one time, only one tag is displayed based on a ranking algorithm. The ranking algorithm may in some simple embodiments be, for example, that the highest valued tag occurring first is displayed. Thus, a tag having a higher value will be more likely to be displayed and worth more to a content provider. The total points of these value or ranking points may be summed or otherwise compared in order to determine an amount to charge a content provider in some embodiments. In other embodiments, this information is only part of a billing system or is not taken into account for billing purposes.

Field 906 shows the number of tasks selected. This field shows the total number of tasks selected by users corresponding to task cues provided by each content provider 490. For example, Dell™ Computer Corp. has recorded one million tasks selected by users. Apple® has recorded 500,000 tasks selected. Those tasks provided by Dell™ and Apple® have generated 1.5 million points and one million points, respectively, as shown in field 907. This information may be utilized in different embodiments for purposes such as billing or analysis. These fields may be analyzed, for example, to determine how many task parts the average user completes for each task cue selected.

Field 908 records the total number of purchases recorded through the current system. For example, 50,000 purchases have been recorded through the current system corresponding to Dell™ Computers. Thus, users have made 50,000 purchases utilizing the savings and reduced prices offered through the system of the embodiment shown.

A total number of points used in those purchases is shown in field 909. For example, for the 50,000 purchases corresponding to Dell™ Computer Corp., a total of 750,000 points have been used. This corresponds to approximately fifteen points per purchase. In one embodiment, each point corresponds to a $0.20 discount. Thus, each purchase has averaged a $3.00 discount, and the total discounts from Dell™ have been approximately $150,000 for all users. Of course, in other embodiments, the discount received for each point may be different than the above example, and may be any value. In some embodiments, the value changes depending on information related to a specific purchase.

Other information than that described here may additionally be provided in advertiser database 770. Advantageously, much more detailed information may be recorded in advertiser database 770 in addition to that described here. For example, information associated with specific task programs, task parts, and task cues may be included. In other embodiments, information related to specific products may be stored. In some other embodiments, advertiser database 770 does not store each of the fields described above.

Transaction database 766 stores information associated with user and client transactions. In some embodiments, this corresponds to information recorded for each transaction. Thus, transaction database 766 may record a purchaser ID, a vendor ID, a transaction number, a product ID, a vendor price, a discounted price, time and date information related to the purchase, the number of points used, and any other relevant information. Thus, the transaction database stores information that may be used to analyze all of the transactions made using the current system. In other embodiments, the transaction database contains fewer fields or is not utilized, and transactions are entirely accounted for using the user or content provider database. One advantage of storing transaction data in a historical database is that it allows for the statistical analysis of information relating to advertisement viewing and purchasing decisions. For example, by comparison with user database 762, transaction database 766 may allow for the identification of viewing and purchasing patterns for users in certain demographics. Further, in some embodiments, this information may be utilized to determine at least in part an amount to charge content providers 490.

Content database 764 includes information provided by content providers 490 and other content that may be accessed by user computer 400. For example, in some embodiments, this includes task programs 760, user-to-user assistance programs, user help files, and the like. For example, the content may include video advertisements, text advertisements, flash advertisements, movies, music, games, software, or other electronic content that may be downloaded by the user. In other embodiments, user computer 400 accesses at least some such content from content provider servers or other user computers rather than service 450. In some embodiments, content database 764 includes user help information 722.

Association table 768 is further stored by service 450. In some embodiments, association table 768 contains information similar or identical to the information stored in association table 408 on user computer 400. Association table 768 may comprise a master list of tags and related information, and may be used to periodically update association table 408. In other embodiments, association table 768 may be used by user computer 400 and accessed over network 430 rather than using information stored in association table 408.

A number of components have been described. It will be understood that these are examples only, and that in other embodiments only some of these components are utilized. In still other embodiments, components that are not described here but are known in the art may be utilized in order to provide additional functionality.

3. Interpreting the Display and Generating Task Cues

Figure 10:
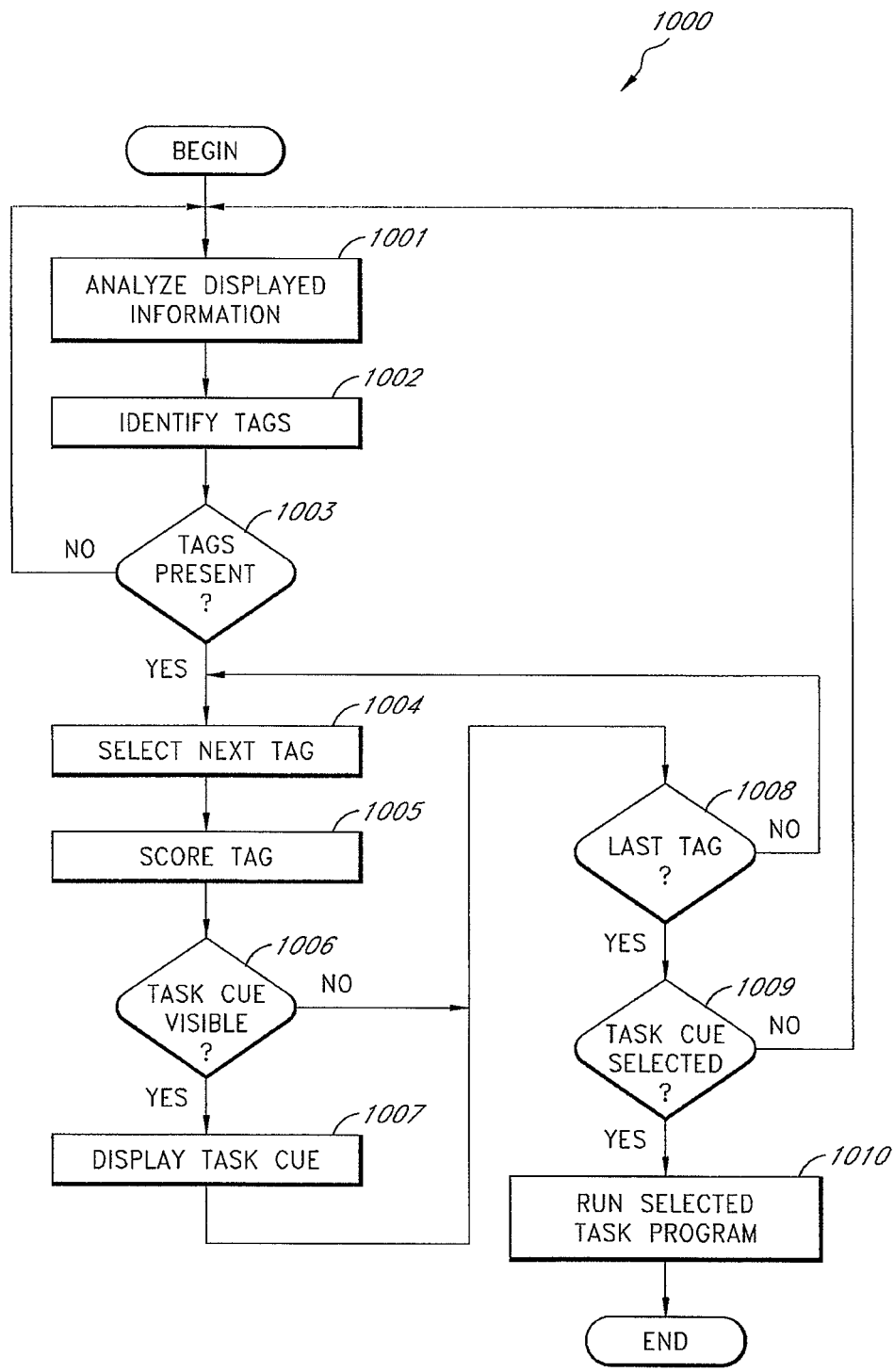
FIG. 10 is a flowchart illustrating one embodiment for interpreting the information presented to a user and generating task cues based upon that information.

FIG. 10 is a flowchart illustrating one embodiment for interpreting the information presented to a user and generating task cues based upon that information. The process described may be implemented as instructions stored on a computer that induce a processor to perform the steps shown. It will be understood that the embodiment described is only one possible method of providing task cues to a user, and that in other embodiments some of the steps shown may not need to be performed, are performed in a different way, or are performed in a different order. In still other embodiments, additional steps are provided. It will be understood that such variations may be used without departing from the scope or spirit of the invention.

Process 1000 begins at state 1001 by analyzing the displayed information. Displayed information typically includes images and text to be shown on a display of the user computer 400. However, displayed information may additionally include other information including audio data. In the event that the user computer 400 is configured to provide other stimulation to a user, for example vibration associated with a force-feedback mouse, then that information may be analyzed in some embodiments as well.

The information displayed may be analyzed in several ways. In one embodiment, a proxy 404 interprets information sent to a browser 402 or some other application. The proxy 404 may remove HTML tags to retrieve the textual data to be displayed by the browser. In other embodiments, the proxy 404 may also search the HTML tags to find, for example, names of images that are being displayed. In another embodiment, proxy 404 interprets a URL address identifying the page to be displayed. As described above, in other embodiments, proxy 404 may be configured to operate on a different application, such as a word processor, media player, or the like.

In another embodiment, a task cue application 604 analyzes a screenshot of the images displayed on the display 410 as discussed above. For example, the system may use an optical character recognition application in order to identify text displayed on the screen. In other embodiments, images are identified using pattern recognition techniques.

After the displayed information has been analyzed or acquired at state 1001, the process 1000 moves to state 1002. At state 1002, the displayed information is analyzed to identify tags in the displayed information. In some embodiments, tags are identified by identifying textual, audio, or video data to tags located in association table 408.

At decision state 1003, the system determines if any tags have been identified. If there are none, then the process 1000 returns to 1001 and acquires new display information that may now contain one or more tags. If there are tags identified, then process 1000 proceeds to state 1004.

At state 1004, an identified tag is selected. In different embodiments, tags may be selected in any order, or analyzed substantially simultaneously. For example, tags may be selected based in part on the order they are displayed.

At state 1005, the selected tag is scored according to a number of factors. For example, the selected tag may be scored by proxy 404 or task cue application 604 according to an algorithm that takes into account the value associated with the tag and stored in association table 408. In other embodiments, a genre 512 of the tag may be stored in association table 408 and may be used to score the tag. For example, demographic information of a user stored in user database 762 may be compared with a genre and certain genres may be scored more highly than others for each user. In other embodiments, specific genres are ranked by the user and that ranked information is stored in user database 762. In other embodiments, no genre information is ranked or stored in user database 762. Other information not present in user database 762 may also be used to score the selected tags such as, for example, the font size of the tag and whether any emphasis is applied to the text. In other embodiments, text tags may be ranked higher than object tags, or vice-versa. In still other embodiments, the order in which the tag appears on the screen relative to other tags may in part determine the ranking.

At decision state 1006 the process 1000 determines if the task cue is visible to a user in part based upon a tag score. In certain embodiments, when the tag score is lower than a certain predetermined value, that task cue is not visible. In other embodiments, the scores of task cues are compared and the highest scoring task cues are displayed. For example, in one embodiment the three highest scoring task cues are displayed. In other embodiments any number of task cues are displayed. In still other embodiments, only the highest ranking task cue is displayed. For example, the system determines if the currently selected tag is scored higher than any previously selected and ranked tag, and if it is not, then the task cue is not visible.

If a task cue is determined to be visible, or if all task cues are visible, the process 1000 displays the task cue at state 1007. A task cue is displayed, for example, next to a tag that was found on the screen. In some embodiments, this may be accomplished by a proxy 404 inserting an HTML tag indicating an image or additional text should be displayed adjacent to or near the tag. A hyperlink may be embedded into this text or image in certain embodiments, such that a user may select the task cue to direct the browser to a new location or to activate a given control such as a task program associated with the task cue. In other embodiments, the task cue may be displayed in a predetermined area of the screen. For example, a frame located near the top of user browser 402 may be used to display task cues in some embodiments. In other embodiments, the task cues may be displayed in the corner of a user computer desktop on the display 410, for example. When the task cue is displayed, typically there will be a visual indicator, for example the stars as shown in FIG. 1. However, in some embodiments, a task cue is indicated by other means, either in place of or in addition to visual stimuli. For example, an audio stimulus may be presented to the user. In these embodiments, a ring or other tone may be played that identifies to the user that a task is available to be selected. In embodiments in which a visual indicator is not present, typically an audio or other cue will be present and indicate a predetermined location on the screen in which to select the identified task cues. If a task cue is not visible or has been displayed, the process 1000 continues to state 1008.

At decision state 1008, the system determines if the selected tag is the last tag identified in the displayed information. If it is not the last tag, then the process 1000 returns to state 1004 and selects the next tag. Process 1000 then begins a loop between states 1004 and 1008 until the last tag has been processed. When the system determines at state 1008 that the last tag has been processed, process 1000 proceeds to decision state 1009.

At decision state 1009 the system determines if the user has selected one of the task cues. The system may decide that a user has not selected one of the task cues when, for example, new information is displayed or after a predetermined amount of time. If the user does not select a task cue, then process 1000 returns to state 1001. If the user does select a task cue, for example, by selecting an image shown on the display 410 or by pressing a key on a keyboard, then process 1000 advances to state 1010. At state 1010, the selected task program is run.

4. Executing Task Programs

Figure 11:
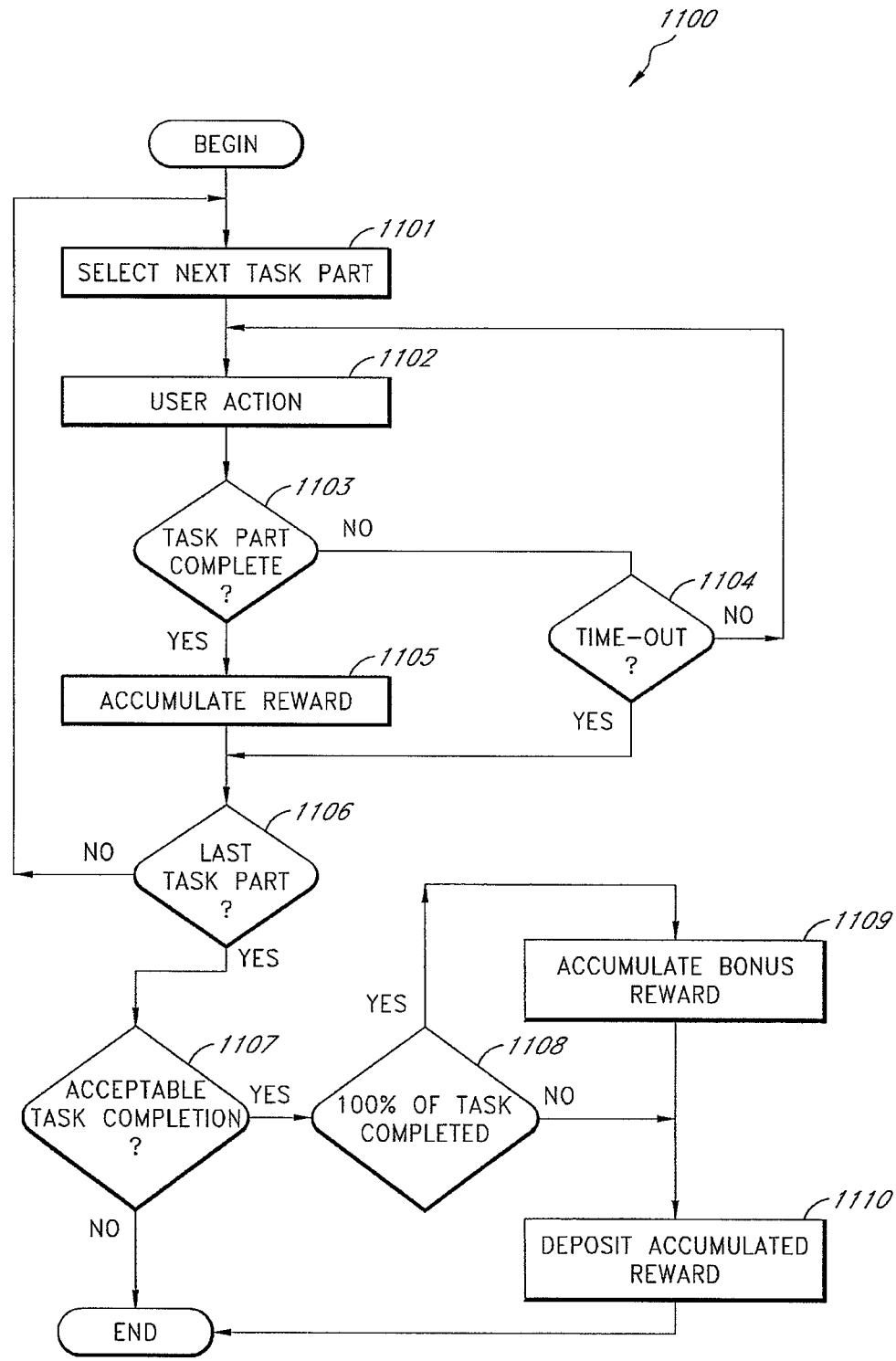
FIG. 11 is a flowchart showing one embodiment of a method for executing a task program.

FIG. 11 is a flowchart showing one embodiment of a method for executing a task program. In one embodiment, a process 1100 executes a task program in response to a command or action taken by the user, such as selecting a task cue. In other embodiments, a task program may be automatically executed, for example based on information displayed to the user.

At state 1101, a first task part is selected. A task program may be comprised of one or more parts. In different embodiments, these parts may be performed either in a parallel or serial fashion. In some embodiments, the order in which task parts are selected is based on input provided by the user. For example, several task cues may be generated by a task program. These task cues may indicate different task parts of the task program that may be selected by the user. In other embodiments, a task part is automatically selected based on the rules of the task program. For example, a number of task parts may be selected and presented in a predetermined sequence.

At state 1102, the selected task part is run and the process 1100 waits for user action. In some embodiments, this user action may include performing a task part. In other embodiments, user action may comprise otherwise interacting with the content on display 410. In other embodiments, no actual user action is required at state 1102, and the process 1100 proceeds to decision state 1103 after a predetermined period of time.

At decision state 1103, the system determines whether the selected task part has been completed. A task part is completed according to the rules of the task program. The selected task part may be completed, for example, by selecting one or more images displayed on a screen. In other embodiments, a task part is completed when an advertisement has finished being displayed, without user interaction. In still other embodiments, a user must interact with a task program and provide information in order to complete a task part. For example, a user may be required to provide information relating to an advertisement, provide information relating to the user, solve a puzzle, play a game, or interact in some other way.

If the task part has been completed at decision state 1103, then a reward is deposited or accumulated at state 1105. The reward may be deposited by sending information indicating that the user has completed the task part to the service 450 over the network. Service 450 may then update user database 762, advertiser database 770, and any other database according to the information included in the information sent from user computer 400. In some embodiments, a reward is accumulated and stored on user computer 400 rather than being immediately deposited. The accumulated reward may be deposited at a later time, as described below.

In one embodiment, an amount of reward points to accumulate or deposit at state 1105 is determined by user computer 400 by accessing the information stored in association table 408 related to the task program being executed. In other embodiments, the task program includes information indicating the value of each task part and provides this data to user computer 400. In still other embodiments, each task part is worth a predetermined amount of reward points, and that value is stored by service 450.

If the task part was not completed at decision state 1103, then the process 1100 moves to decision state 1104. The system then determines whether the task part has timed-out. In some embodiments, each task part is available for a limited amount of time, such as five, ten, or thirty seconds. In other embodiments, each task part is run until the user completes the task part. If the system does not time-out, then the process 1100 returns to state 1102 and awaits a user action. If the task part times-out, then the process 1100 proceeds to decision state 1106.

After reward points are accounted for or a task part times-out, the system determines if the selected task part is the last task part of the current task program at decision state 1106. If the selected task part is not the last task part, then the process 1100 returns to state 1101 and a new task part is selected. The process 1100 then cycles through states 1101-1106 until the last task part is processed. If the task part is the last task part, then the process 1100 advances to decision state 1107.

At decision state 1107, the process 1100 determines if an acceptable portion of the task program has been completed. In some embodiments, reward points that have been accumulated are only deposited if this acceptable portion has been completed. An acceptable portion may be determined in some embodiments by the task program. For example, a task program may require that each of the task parts must be completed for any reward to be deposited. In another embodiment, approximately half or some other portion of the task parts must be completed. In still other embodiments, certain portions of the task program must be completed such as the first and last task parts. In this way, the process 1100 may advantageously reward behavior that indicates a specified minimal level of attention or performance, while not rewarding behavior below this level. If the task is not completed acceptably, then the process 1100 ends. If an acceptable portion of the task program has been completed, then the process 1100 moves to decision state 1108.

In one embodiment, the process 1100 issues rewards to the user if the user completes a threshold level of tasks. The threshold level may be, for example, 100 percent of the tasks, 90 percent of the tasks, 80 percent of the tasks, 75 percent of the tasks, 70 percent of the tasks, 60 percent of the tasks, 50 percent of the tasks, or the like. The threshold level may be expressed in percentage terms, raw numbers terms, or other terms. For example, if there are 10 total tasks, the threshold level may be expressed as completing 90 percent of tasks or 9 of the tasks. If there are 7 total tasks, the threshold level may be completing 4 tasks. Alternatively or additionally, the process 1100 may use a formula to determine, quantitatively or qualitatively or both, whether the user sufficiently completed the tasks. For example, the process 1100 may assign a point value to each task completed, may add up the total points obtained, and issue rewards based on how many points were obtained. Thus, if there are four tasks, an A task may be worth 1 point, a B task worth 2 points, a C task worth 3 points, and a D task worth 4 points. If the threshold level were 4 points, the user could be rewarded by completing the D task or the C task along with any other task. However, if the user completed only the A task, or the A task and the B task, the user would not have enough points to be rewarded. Alternatively or additionally, the process 1100 may be configured to reward partial rewards for partial completion of tasks. For example, if the user completes the A task and the B task, but not the C task or the D task, the user may receive three reward points instead of ten. A skilled artisan will appreciate, in light of this disclosure, that any mathematical formula can be used to determine whether a user qualifies for a reward.

Decision state 1108 determines if 100 percent of the task was completed. If 100 percent of the task was completed, then the process 1100 accumulates a bonus reward at state 1109. Otherwise, the task ends. In other embodiments, different criteria may be used to determine if a bonus reward is accumulated. For example, different bonus rewards may be accumulated for completing different percentages of the task. In one such embodiment, a task contains five task parts, and a user receives one reward point for completing each of the task parts at states 1101 through 1106. According to an embodiment of state 1107, any amount of completion is acceptable to earn reward points. Then, at state 1108, the system may indicate that if the user completed three of the task parts to accumulate an additional point, to accumulate two points if four task parts have been completed, and three if all five task parts have been completed. Thus, a user that completed all five task parts in this example would accumulate eight reward points throughout the process 1100. After these reward points have been deposited at state 1110, or in the event that reward points have not been earned, then the process 1100 ends.

5. User Assistance Tasks

Some example applications in which principles of the embodiments described herein may be used will now be explained. The invention is not limited to these example applications. Rather, a skilled artisan will understand, in light of this disclosure, how to adapt the principles set forth herein for use with many applications that are not explicitly described herein.

Figure 12:
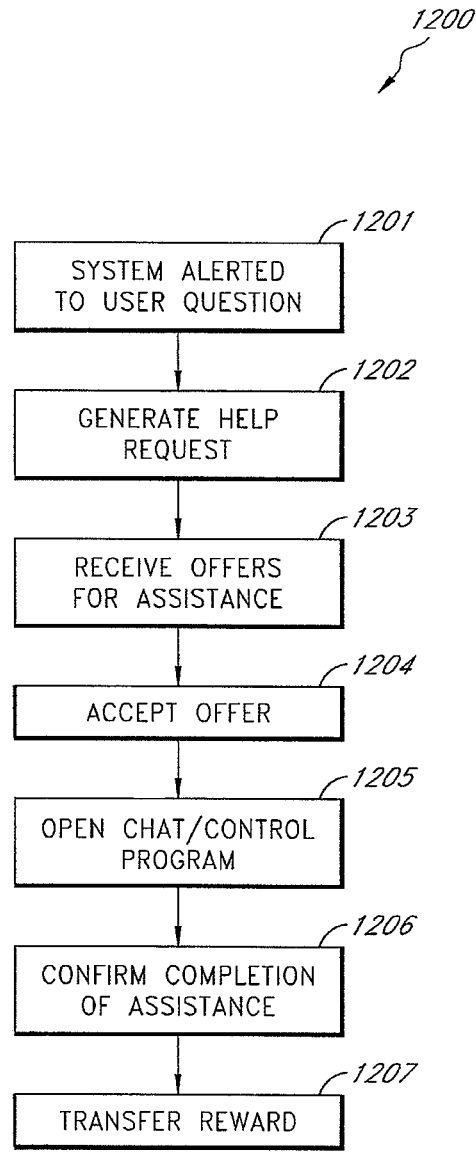
FIG. 12 is a flowchart showing one embodiment of a process for receiving assistance from a remote user.
Figure 13:
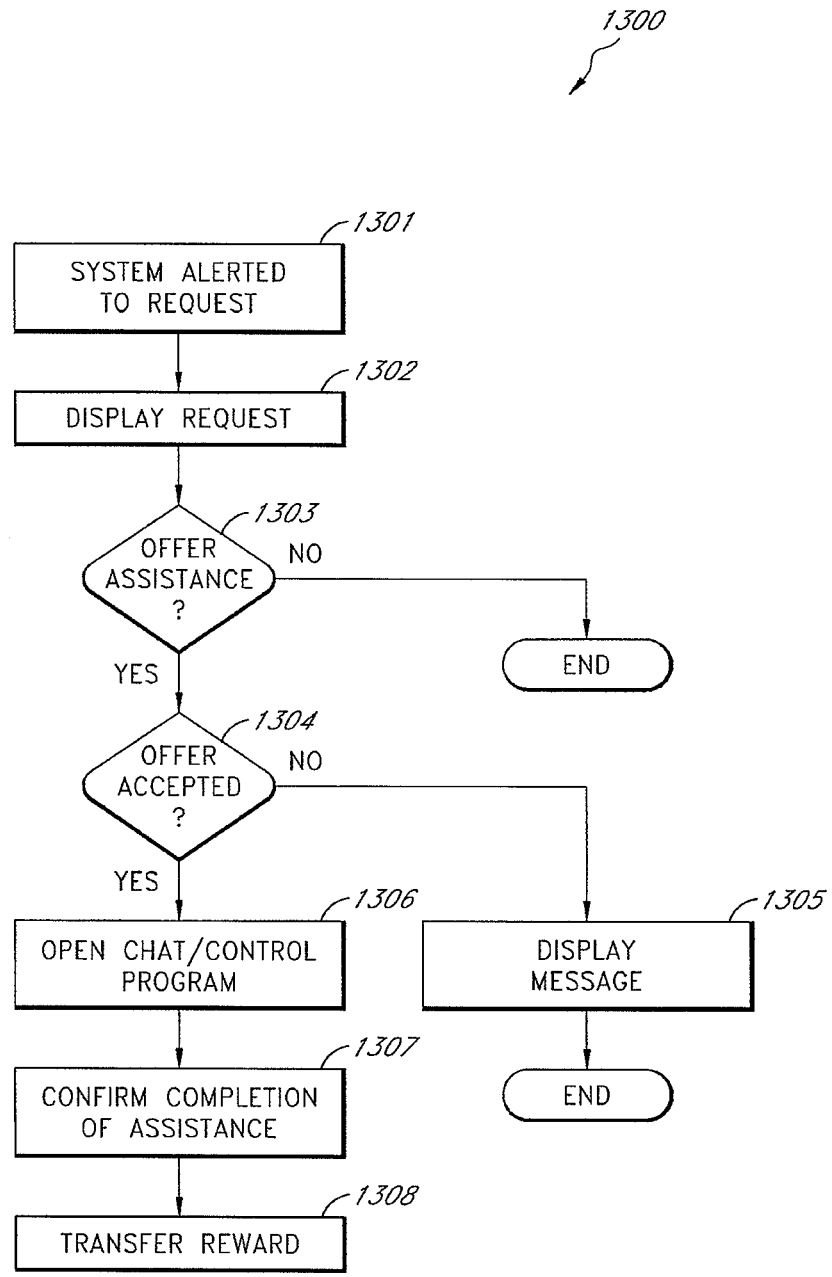
FIG. 13 is a flowchart showing a similar process executed by the remote user in order to provide assistance.
Figure 14:
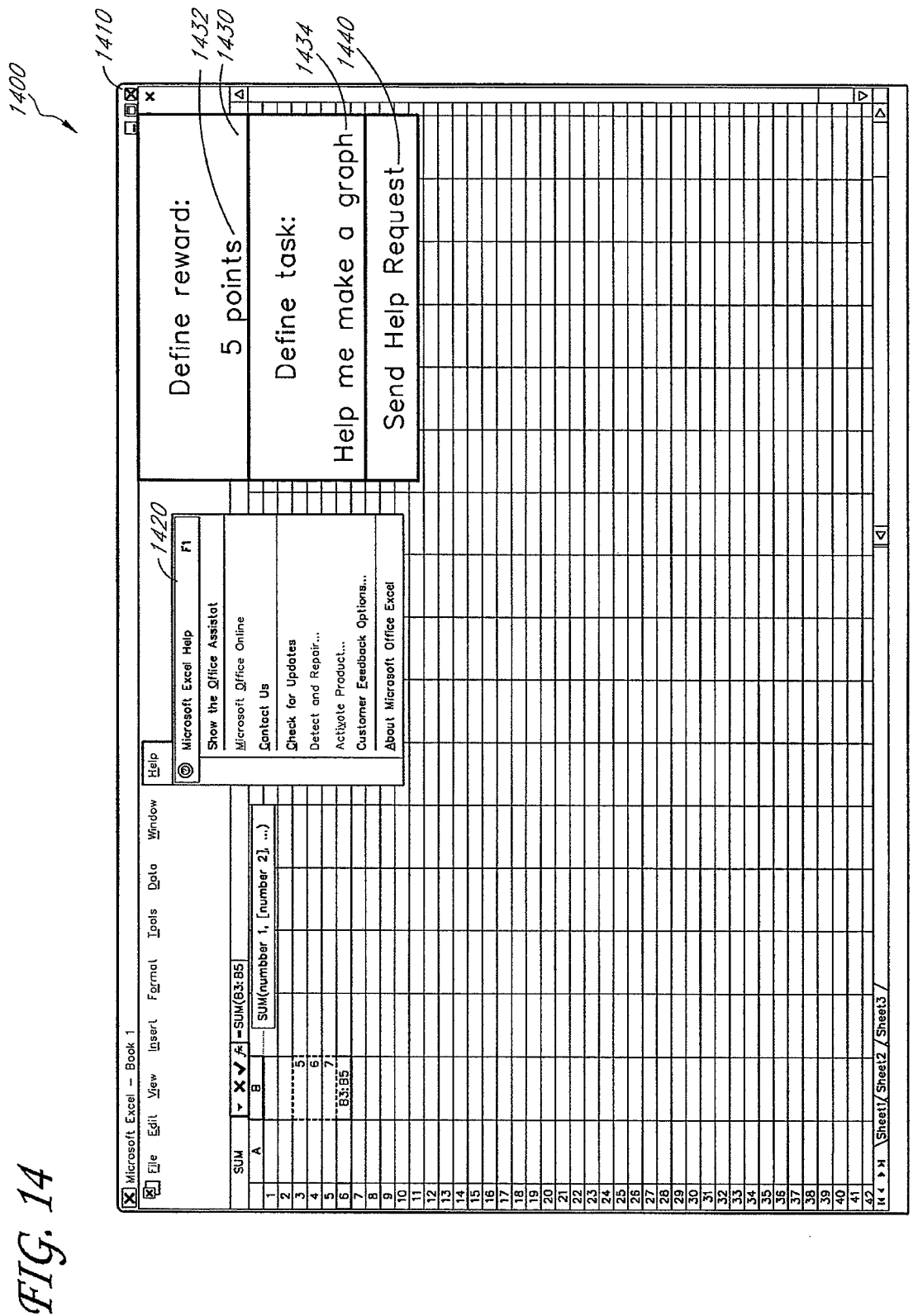
FIG. 14 and FIG. 15 are screenshots that represent certain steps in exemplary processes of receiving and providing assistance.
Figure 15:
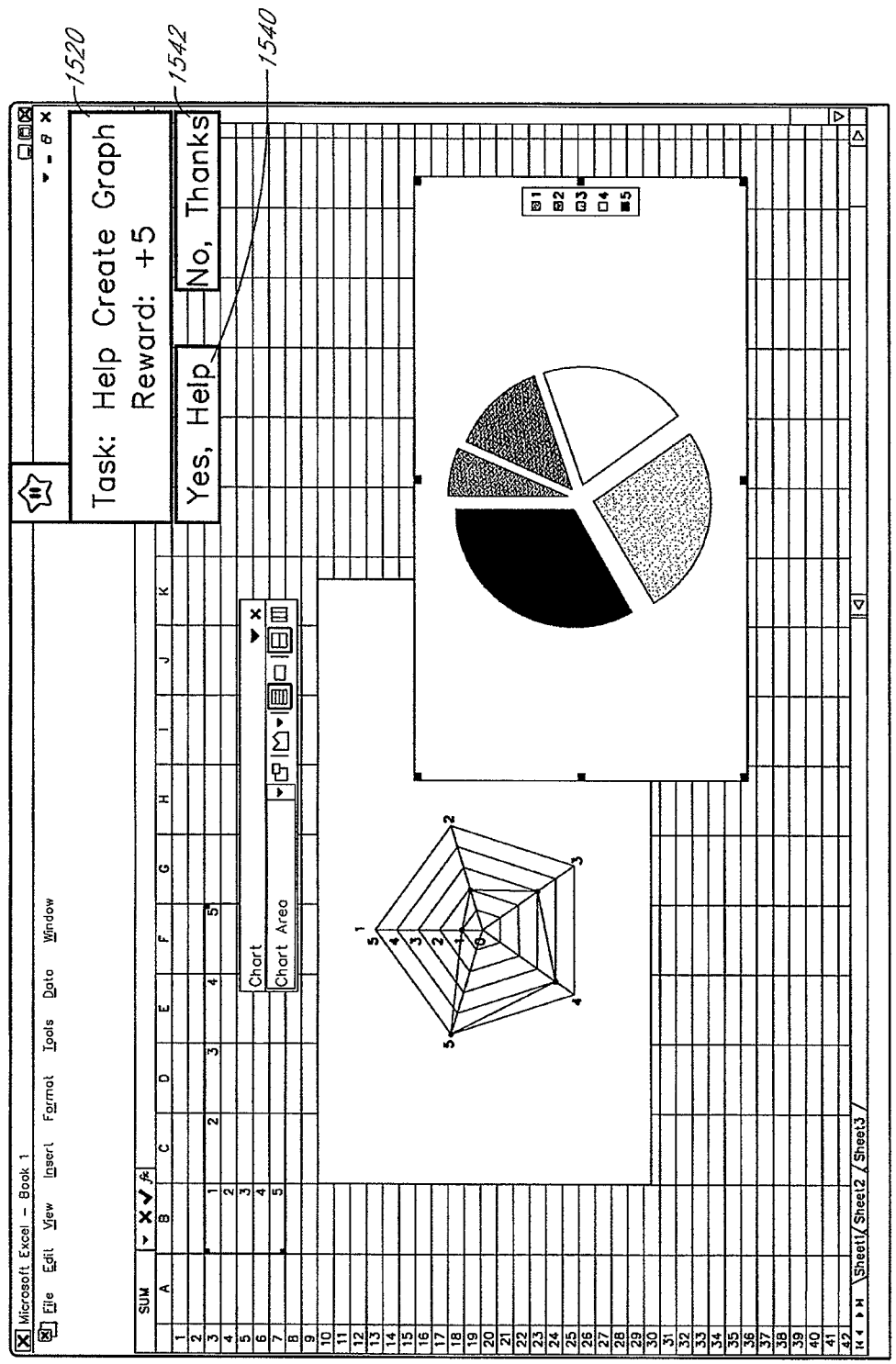

FIG. 12 is a flowchart showing one embodiment of a process executed on a user computer 400 in order to receive assistance from a remote user. FIG. 13 is a flowchart showing a similar process executed by the remote user in order to provide assistance. FIG. 14 and FIG. 15 are screenshots that represent certain steps in this process according to one embodiment.

At state 1201 of process 1200 shown in FIG. 12, the system is alerted to a user question. In certain embodiments the system may be alerted by an action taken by the user. For example, with reference to FIG. 14, a user may select an option in the 'Help' menu 1420 of an application 1410, or the act of selecting the 'Help' menu 1420 may alert the system. In other embodiments, an image located in a predetermined area of the user desktop 1400 allows the user to select that area in order to alert the system. In still other embodiments, a word processor detects when a user has stopped typing for a predetermined amount of time and alerts the system. In one embodiment, the system detects writer's block by this process or by determining if a user has added and then deleted a small amount of content repeatedly. For example, when a user types a sentence, deletes it, and repeats that process. This list is not exhaustive, and many other methods may indicate when a user requires assistance according to different embodiments of the invention.

When the system is alerted to a user question it proceeds to state 1202. At state 1202, a help request is generated and transmitted across the network 430. The process of generating the help request may involve prompting the user to answer certain questions. For example, the user may be asked what application he or she is using. The user may also be asked to describe his or her problem. In the example shown in FIG. 14, the user has defined the problem as "Help me make a graph" at text entry block 1434. In some embodiments, the user may determine a number of reward points from his or her account to offer in return for assistance, for example, by entering the quantity in text entry block 1430. In some other embodiments, the amount of points offered is automatically determined based on the defined problem, the application, or some other information. In the embodiment shown in FIG. 14, five reward points 1432 are offered for the help request shown. In still other embodiments, the user is not required to provide any information and a help request is automatically formatted. In some embodiments, the help request is activated by a user selection, such as selecting button 1440. In other embodiments, the help request is automatically activated. The help request may then be sent over the network 430 to service 450.

At this point, service 450 distributes the help request to remote users, which receive the request at state 1301 in FIG. 13. The remote user systems are then alerted to the help request and, as shown in FIG. 15, the request 1520 is displayed on the remote user desktop 1500 at state 1302. In some embodiments, the request is displayed in a predetermined location of a display. In other embodiments, the user is alerted by an audio signal either alone or in conjunction with a visual display. The information presented to the remote user may indicate the specific problem provided by the first user, the expected number of points offered for completing the assistance, and the like.

Based on that information, the remote user determines at decision state 1303 whether or not to offer assistance. The remote user may decline to offer assistance in some embodiments by selecting an area of the screen. For example, the remote user may select the "No, Thanks" button 1542 in FIG. 15. In other embodiments, the remote user may decline to offer assistance by not responding, and after a predetermined amount of time the message will automatically be removed. If the remote user does not offer assistance, then the process 1300 ends. If the user decides to offer assistance, he or she may do so, for example, by selecting a predetermined area of the screen, such as the "Yes, Help!" button 1540 shown in FIG. 15. When the remote user accepts the offer, that acceptance is sent either directly to the first user or in some embodiments sent to the service 450 and forwarded to user computer 400.

The user requesting assistance receives offers for assistance at state 1203 of process 1200. At state 1204, one of the offers is accepted. An offer may be accepted, for example, by selecting one of several displayed offers. In other embodiments, an offer is automatically selected and accepted based on one or more factors such as when the remote user made the offer, a stored representation of the remote user's reputation, a distribution system designed to spread opportunities to offer assistance substantially equally among remote users, or the like. In some embodiments, the decision of which offer is accepted may be made at least in part by user-to-user module 754 of service 450. For example, user-to-user module may receive data representing a number of accepted requests and determine an acceptance to forward to user computer 400 based upon a programmed algorithm that weighs factors associated with the remote user stored in user database 762.

When the offer is accepted at state 1204, data is sent either to the remote user or the service 450 indicating the acceptance. In some embodiments, user-to-user module 754 or user computer 400 sends a message to the remote user over the network 430 if the offer is not accepted. In other embodiments, the remote user determines that the offer has not been accepted if no message is received within a predetermined amount of time. At state 1304 this information is utilized in determining whether the offer has been accepted. If the offer is not accepted, a message to that affect may be displayed to the remote user at state 1305. Otherwise, process 1300 proceeds to state 1306.

At state 1306 a chat or remote control application is opened between the first user and the remote user. This state 1306 corresponds to the state 1205 of the first user process 1200. The chat or control application allows the remote user to either discuss the problem with the first user or directly manipulate the first user's application. In some embodiments, this involves executing an Internet chat program already installed on user computer 400, such as AOL® Instant Messenger. In other embodiments, user computer 400 and the remote user are induced to access a network server containing the necessary communication software. For example, the network server may host a webpage interface that allows user computer 400 and the remote user to login and send instant text messages that are displayed on the webpage. In still other embodiments, user-to-user module 754 transfers information to the user computer 400 and remote user including contact information. For example, user-to-user module 754 may access user database 762 and send a corresponding e-mail address for each user to the other user in order to allow them to contact each other via e-mail.

At states 1206 and 1307, completion of the assistance is confirmed. Completion may be confirmed by either user or by both users. In some embodiments, completion is confirmed by a user logoff or disconnect from the network communication program. In other embodiments, an image is displayed indicating that the user may select that image in order to end the assistance program. In some embodiments, multiple images are available that allow the first user to end the assistance program and also indicate whether that user was satisfied with the assistance provided. For example, various selections may be available indicating whether the remote user assistance was helpful or not, or rating the assistance on a scale.

At states 1207 and 1308, a reward is transferred to the remote user. In one embodiment, this reward is deducted from the first user's account. In one such embodiment, the amount deducted from the first user's account is related to the amount credited to the remote user's account, but either amount may be modified. For example, the remote user may receive additional points based on a feedback score he or she has attained. Likewise, fewer points may be deducted from the first user based on that user's feedback score. The amount transferred may be determined by a variety of different methods. In different embodiments, the amount may be determined at least in part based on the question or problem presented, an agreement between the users, the amount of time required to complete the assistance, the specific software application for which help was needed, or some other classification. In some other embodiments, reward points are not transferred between users. In some of these embodiments, receiving assistance does not result in any deduction of reward points from a user account.

The foregoing method of providing user-to-user help has many advantages. In one advantageous use, a software company may include in its software the tools necessary to invoke such user-to-user help. Further, in order to encourage software users to rely on the user-to-user help, the software company may give to each user a certain number of reward points that are used as a currency for paying for, or providing, help to other users. For example, the software company may give each user 100 points that can be used for user-to-user help. As some users rely on others for user-to-user help, those users providing help would naturally consolidate a large number of points, which could be redeemed for discounts on merchandise, cash, or some other reward offered by the software company. In one embodiment, users that ran out of points but require additional help could earn points in other ways (such as viewing advertisements), or could buy additional points from the software company. Advantageously, the user-to-user help feature may induce consumers to provide help to each other and may thereby reduce the software company's costs for providing customer service.

6. Viewing Media

In one embodiment, a user utilizes reward points earned by completing various tasks to earn access time for viewing media on user computer 400. For example, the user may select a movie to view that is available from a content provider website. An allotted play time may be shown on the display, for example as a clock and/or a bar. When the bar has time remaining, then the movie may continue to play. When the bar is emptied, the movie stops and the user may perform a task, such as assigning more points from the user's account or viewing one or more advertisements before the movie starts again.

Figure 16:
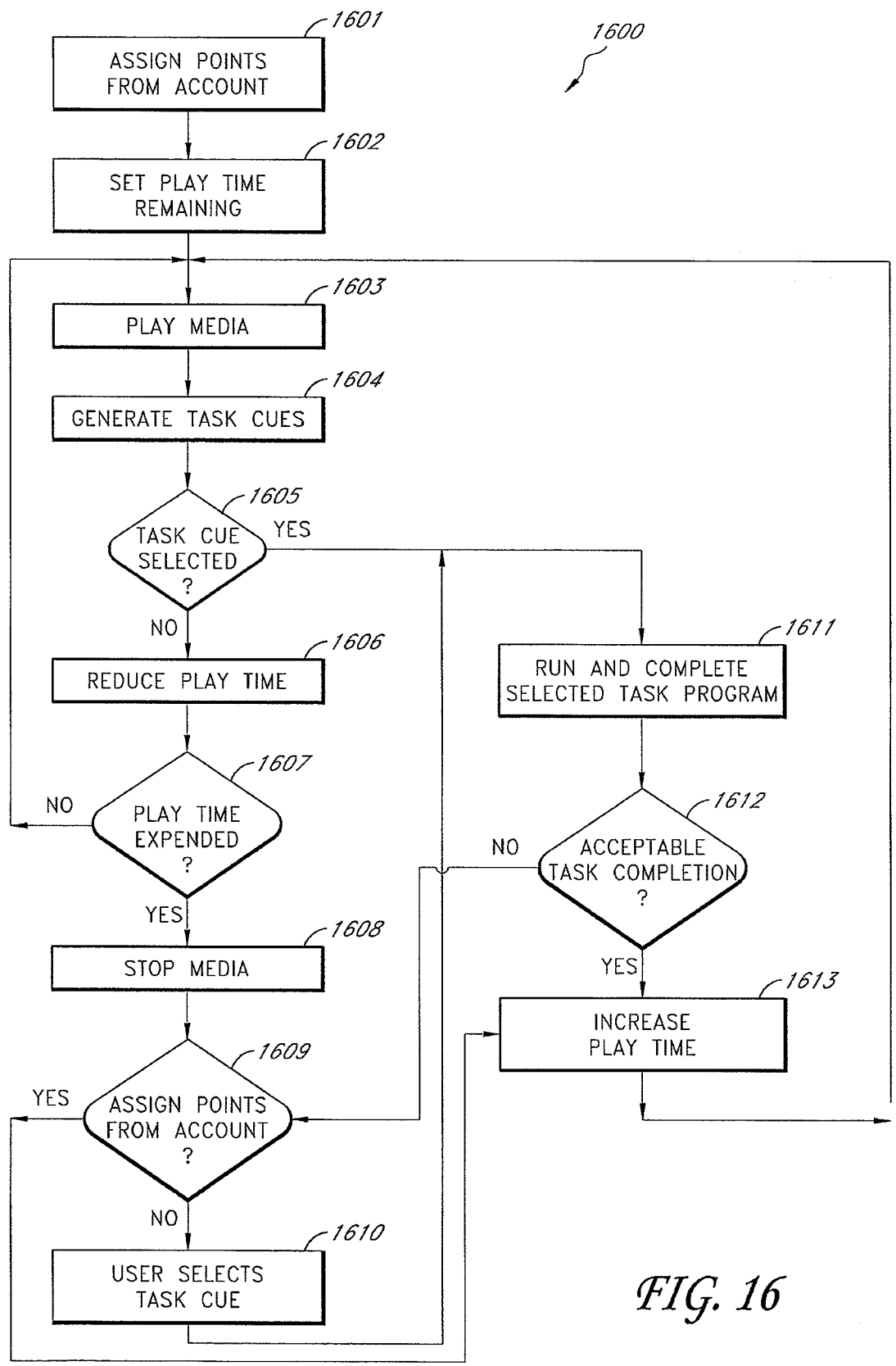
FIG. 16 is a flowchart showing an embodiment of a process for allowing a user access to media.

FIG. 16 shows an embodiment of a process for allowing a user access to media. While FIG. 16 is at some points described with reference to watching a video, it will be understood that in other embodiments, the concepts described may be applied to other forms of media such as playing songs or the like. Furthermore, it will be understood that while this description focuses on setting a play time and media access, in some embodiments other forms of content may be accessible, such as computer software or the like. In some embodiments, play time may correspond to an access time rather than a play time, or may correspond to a privilege level that determines in part the features of a particular application that the user may have access to.

Process 1600 begins at state 1601, in which points are assigned from a user account such that the user can pay for content with points from his or her reward account. The process 1600 proceeds to a state 1602, where an allotted play time is set. The allotted play time may be set in some embodiments to a default level. In some embodiments, the default allotted play time is increased based upon a number of points a user exchanges from his or her reward account as depicted in state 1601. In some embodiments, the play time may have a maximum value. For example, the play time may not exceed a "100%" threshold which may correspond to an initial play time or to a certain number of points. This threshold may correspond to a given amount of time, such as one minute, ten minutes, thirty minutes, an hour, or any other amount of time. In other embodiments, there may be no maximum play time, so that a user may exchange points or earn additional play time according to the methods described here indefinitely.

The process 1600 proceeds to state 1603 after the allotted play time has been set. At state 1603, the media file is played. For example, a movie may be downloaded to user computer 400 and played utilizing a media program. In other embodiments, the movie may be displayed within a web browser, for example as an ActiveX control object in an Internet Explorer browser.

As the movie or other media is being played, task cues may be generated at state 1604. In one embodiment, task cues may be displayed at a predetermined location on the screen. For example, task cues may be displayed in a banner area of the media player utilized to display content related to media files. In other embodiments, the task cues may be displayed within the area of the screen that the media file is being displayed. In some embodiments, task cues may be displayed intermittently or at regular intervals. In other embodiments, a task cue may be displayed substantially continuously until the task cue is selected. In still other embodiments, task cues are not displayed while the media file is being displayed. Visual task cues have been described, but other stimuli, such as audio task cues, may be utilized.

At decision state 1605, the system determines if a task cue has been selected. If a task cue has been selected, then process 1600 proceeds to state 1611 and runs the selected task program. Otherwise, the system proceeds to state 1606 and reduces the allotted play time.

At decision state 1607, the system determines if the play time has been completely expended. If so, then the movie or other media stops at state 1608. Otherwise, the process 1600 loops back to state 1603. This process may occur substantially continuously in some embodiments. In such embodiments, the amount the play time is reduced at state 1606 may be relatively small, such that the play time is slowly depleted. In embodiments where the process 1600 loops at longer intervals, for example each time a task cue times out, the amount the play time is reduced at state 1606 may be greater. In such an embodiment, the actual rate at which the play time is depleted may therefore approximate the rate for embodiments in which the play time is reduced continuously. In different embodiments, these rates may be adjusted for various factors. For example, a user feedback score may indicate that the play time should be reduced more slowly. This may be accomplished in some embodiments by adjusting the amount the play time is reduced during each cycle at state 1606. In embodiments where a clock is displayed, the timer preferably accurately reflects the time remaining, and adjustments are made by adding more or less time rather than adjusting the speed of a timer countdown.

When the movie or other media has stopped at state 1608, the system proceeds to decision state 1609 where the user may be given the option to assign additional reward points from his or her account to increase the play time. If the user does so, then the process continues to state 1613, increases the play time, and then returns to state 1603 and plays the media file.

If the user chooses not to assign additional reward points, then at state 1610 the user is prompted to select a task cue. In some embodiments, state 1609 is not performed and a task is automatically selected. In some embodiments, the user may watch portions of the media file already viewed without assigning points or performing a task and increasing the allotted play time.

When a task cue has been selected either at state 1610 or at decision state 1605, then the process 1600 proceeds to state 1611 and the task program associated with the selected task cue is run and completed. In some embodiments, this process is similar to that described above in section 4 with reference to FIG. 11. As has been described herein, the process 1600 may make a determination about whether the user's completion of the task program is acceptable at state 1612. In some embodiments, when the task has been completed in an acceptable manner, play time is increased at state 1613. In other embodiments the user's reward account is increased, and the user may then choose to use those reward points to increase the play time.

At state 1613, the play time is increased in an amount corresponding to the points deposited or the value of the task performed. The process may then return to the state 1603 and facilitate continued viewing of the media file.

7. Preferred Programming

In another embodiment, reward points are offered to entice a user to download and run certain computer programs, to purchase a certain product, or to otherwise encourage a user to perform an action. For example, a software distributor may desire to encourage users to try a demonstration version of a program so that the users can become familiar with the product and recognize the advantages it offers. In one embodiment, music or other media may be downloaded, for example, to encourage users to purchase related media or products. Accordingly, task cues may be incorporated into these applications or files as a mechanism for providing reward points for these desired actions.

In some embodiments, a program is identified by tags such as text or images associated with the program. When the tags are located or identified on the display, then a task cue is generated. When the user selects the task cue, the user is directed to download the program. If the user does download the program, the user may acquire reward points according to embodiments previously discussed. In other embodiments, a task program is associated with the download or a link to download the actual installation file. For example, a user selects a link to download the file from a distributor or content provider website. An install application is run, and additionally a task program is run. That task program rewards the user for completing the install. The install program may be run as a task program, or a task program may comprise an install program. Thus, completing each step of the installation may comprise task parts. Completing each task part may cause the accumulation of reward points, as discussed above. In certain embodiments, only when each task part is completed, and thus the entire program has been installed, are reward points deposited. Alternatively or additionally, reward points may be rewarded based on the total number of times that the user opens the program, the total length of time that the program is running, or both. The system may also detect actions that a user takes within the program, such as, for example, when the user selects menu items, enters data, resizes or moves windows, and the like. The system may reward the user for actions taken rather than just running a program in order to deter users from downloading a program and opening the program frequently without really using the program.

In some embodiments, tags associated with the installation of a program, or with actions taken within the program, are located in association table 408. For example, certain text or images are displayed in an installation program window, and that text or those images are provided to association table 408 so that they will cause a task cue to be generated when the installation is executed. A task cue generated in this way may allow a task program to be performed, or may automatically perform a task program. In other embodiments, the task program generates task cues corresponding to locations or existing buttons on the install application indicating that the user is moving forward in the installation process. For example, a task part may comprise selecting the 'next' button in an installation program.

In other embodiments, rather than using a text or image tag, the tag comprises a data object that is automatically transferred by the installation program to proxy 404 or task cue application 604. The data object may induce the proxy 404 to execute a task program in some embodiments without user interaction.

8. Using Rewards at the Time of Purchase

Figure 17:
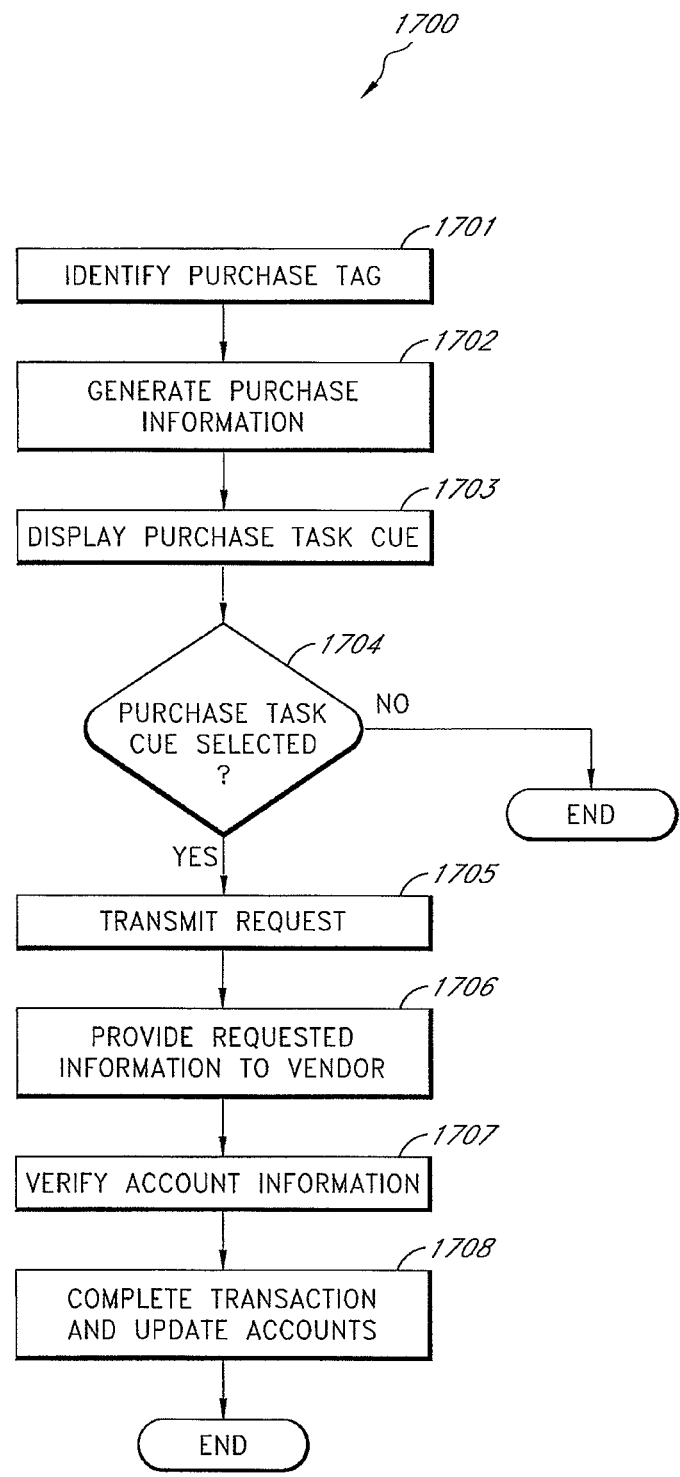
FIG. 17 is a flowchart showing an example of a process for executing a transaction.

Having acquired a number of reward points according to one or more of the methods described above, a user may exchange these reward points, for example to apply towards a reduction in the price of a product or service offered by a content provider 490 or some other vendor. An example of a process 1700 for executing a transaction according to one embodiment is described below with reference to FIG. 17.

A user may visit a website such as the Apple® website shown in FIG. 3. If this website includes a tag indicating that a product is available for purchase, then at state 1701 that purchase tag is identified. A purchase tag may be identified in certain embodiments according to an indication stored in association table 408. In other embodiments, the task cue contains information indicating that something is available for purchase, and the tag itself identifies the task cue, rather than being identified as a purchase tag.

Whether association table 408, the task cue, or some other means indicates that an item is available for purchase, purchase information is generated at state 1702. In some embodiments, purchase information includes a manufacturer's price, a discount rate available to the user, an offered price based on information in the user database 762, and the like. That information may be displayed as a task cue at state 1703. For example, as shown in FIG. 3, purchase information such as the manufacturers suggested retail price ($199), a discount ($100), a discounted price ($99) are displayed in the transaction information bar 340. The transaction information bar may further indicate a method for purchasing the product. For example, the task cue 350 shown in FIG. 3 includes a 'purchase' button, indicating that a user may select that location of the screen to purchase the product at the discounted price of $99.

At decision state 1704, it is determined whether the purchase task cue has been selected. If the user does not choose to purchase the item, the process may end. If the user does select the purchase task cue, indicating a desire to purchase the item at the reduced price, a request is transmitted from user computer 400 to the content provider 490 or other vendor at state 1705. In some embodiments, a similar request or duplicate request is generated and sent to service 450 to mediate or record the transaction. In some embodiments, service 450 is the vendor. The request may, for example, redirect the browser 402 to a purchase screen on a content provider website. In other embodiments, another software application is opened or loaded on user computer 400 for processing the transaction.

At state 1706, the user provides requested information to the vendor. In some embodiments, requested information includes the purchaser name, mailing address, payment method, and the like. The requested information may also include account information indicating, for example, the user's ID and number of reward points available. In some embodiments, user computer 400 transmits this information automatically when the purchase task cue is selected. In other embodiments, user computer 400 transmits data to service 450 that may induce service 450 to transfer information related to the user to the appropriate content provider 490 or vendor. In other embodiments, the user is provided with a code that may be entered into a 'coupon code' field commonly available on purchasing websites. That code may contain information that allows the purchasing vendor or website to determine how much credit the user is entitled to.

At state 1707, account information is verified. In some embodiments, content provider 490 or the current vendor may transmit information provided by the user at state 1706 to service 450. The information may then be utilized to verify information such as that an account exists and that the appropriate number of reward points are available.

When the information is verified, the process proceeds to state 1708 where the transaction is completed and the appropriate accounts are updated. For example, transaction processor 758 may receive transaction data at any previous step such as states 1705 or 1706 and access user database 762, transaction database 766, advertiser database 770, or any other database in order to modify the data stored there so that it reflects the current transaction. For example, the transaction processor 758 may decrease the amount of reward points available for the user in user database 762. Account information stored locally by the user computer 400 or content provider 490 may also be updated in some embodiments.

9. Feedback

In certain embodiments, a feedback system further rewards users that exhibit positive behavior relative to the tasks provided by service 450. For example, a user that consistently views advertisements and uses the points earned watching those advertisements to purchase related products may establish a positive feedback score. Users that demonstrate behavior that may represent attempts to abuse the system, to gain rewards without actually viewing advertisements, or who repeatedly use reward points on products unrelated to the advertisements used to generate those points may establish a negative feedback score.

A user feedback score may be kept, for example, in the user database on service 450. A copy of this information may also be stored on user computer 400 in order to allow the system to update the user as to his or her feedback score without logging-in to service 450. In other embodiments, when the system loaded on user computer 400 generates a task cue including an option to purchase a product at a reduced price, the user computer accesses the service 450 in order to determine a user feedback score and uses this to compute the reduced price.

In the embodiment shown, the user feedback score is generally between about 0.0 and 2.0, and the user feedback score is a multiplier applied to points earned by a user completing a task to reward users for positive behavior. For example, in the embodiment shown, user 'John' has a feedback score of 0.6, so that if he completed a task worth 10 points, he would receive 6 points. In contrast, user 'Jane' has a feedback score of 1.5. If she completed the same task worth 10 points, she would receive 15 points. In certain embodiments, different numbers are used to represent a feedback score other than numbers between 0.0 and 2.0. In some embodiments, these values do not correlate with a score multiplier. For example, a user having a feedback score of 5 in one embodiment does not receive 5 times the normal points, but some other value such as 1.5 times the normal value. Feedback score 804 is generally determined by feedback module 752 based on other information stored in user database 762 such as account value 805, number of points used 806, number of purchases 807, and the number of tasks completed 808. The feedback score 804 computed may be a function of these values.

The feedback score 804 for user 'John' is computed as a function of these or similar values. For example, because the user's ratio of 'points used' to 'purchases' is relatively high, 'John' has a lower than normal feedback score. From the perspective of content provider 490, it is generally preferred that the ratio of points used to purchases is low, and therefore points are spread out over many purchases. For example, 'Jane' has 20 purchases and has used 250 points. Even though 'Jane' has used more points than 'John', the ratio of points to purchases is higher. Therefore, and because she's completed a large number of low point tasks, her feedback score is 1.5, and thus she receives 1.5 points for every point she would otherwise receive in this embodiment. In other embodiments, different relationships may be measured and other behavior may be determined to be positive behavior.

In cases where more points are used with the vendors for which task programs are performed, the feedback score may be higher because this is generally positive behavior. When the user views content provided by a first content provider in order to generate account points and then uses those points to purchase goods from a different content provider 490 at a reduced price, then this may correspond to negative behavior since the user is not viewing ads corresponding to products the user is interested in. The feedback score may therefore be reduced in response to this behavior in some embodiments.

10. Advertising Method

Figure 18:
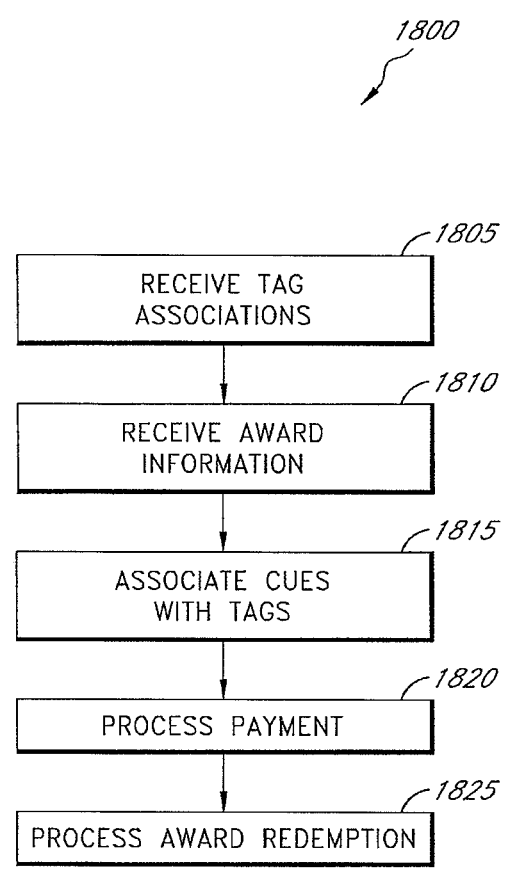
FIG. 18 is a flowchart that illustrates, in one embodiment, a process of processing payments for advertising.

Embodiments of the systems and methods described herein provide an advantageous way for merchants to pay for advertising. The term "merchant" is used herein to refer broadly to an entity that provides goods, services, or content. FIG. 18 is a flowchart that illustrates, in one embodiment, a process of processing payments for advertising. The process 1800 includes receiving tag associations, receiving reward information, associating cues with tags, processing payment, and processing reward redemption. In a state 1805, the process 1800 receives tag associations. Receiving tag associations includes receiving information from a merchant regarding which textual, graphical, or other tags the merchant wants to have advertising associated with. For example, a merchant may choose to have advertising associated with the textual tag "Dell Computer." In such a case, the merchant communicates this desire to have advertising associated with "Dell Computer" and, in the state 1805, the process 1800 receives this tag association. The tag associations are preferably received electronically over a computer network, but they may be received in any manner known to a skilled artisan, including, for example, via telephone, fax, person-to-person communication, e-mail, letter, text messaging, instant messaging, or the like.

In a state 1810, the process 1800 receives reward information. Receiving reward information includes receiving information about discounts or other rewards that a merchant is willing to sponsor. For example, the process 1800 may receive information that a merchant is willing to offer a $0.20 discount on certain goods for every reward point redeemed by a consumer. The process 1800 may also receive information that the merchant is willing to give a user 10 reward points for completing a task. The information is preferably received electronically over a computer network, but it may be received in any manner known to a skilled artisan, including, for example, via telephone, fax, person-to-person communication, e-mail, letter, text messaging, instant messaging, or the like.

In a state 1815, the process 1800 associates cues with tags. In one embodiment, associating cues with tags comprises creating electronic records, such as records in a database, that represent the associating between a cue and a particular tag. As described above, certain embodiments of the systems described herein refer to such associations in a database in order to generate content in which task cues are displayed along with the associated tags.

In a state 1820, the process 1800 processes payment. In one embodiment, each advertiser that sponsors rewards and that has task cues associated with certain tags is required to pay fees to participate in the process 1800. For example, in one embodiment, an advertiser pays a cue association fee for the right to have cues associated with a specific tag. Thus, for example, an advertiser may pay a cue association fee simply to have cues associated with "Dell Computer." In one embodiment, cue association fees are set by auction, such that the entity willing to pay the most for having cues associated with a particular tag will win that right. In one embodiment, the cue association fee is paid without regard to how many times the tag is displayed. Alternatively or additionally, fees based on how many times a tag is displayed can be assessed.

Other fees may be assessed for rewarding points. As will be appreciated, because reward points can be redeemed for discounts or other rewards, they have an economic value to the users who receive them and an economic cost for those entities who accept the points for discounts or other rewards. Accordingly, in one embodiment, an entity pays a fee to cover the cost of any points that the entity rewards. In one embodiment, the reward fee is slightly higher than the actual cost of the points so as to also include a transaction fee for participating in the process 1800. In another embodiment, each merchant pays only a transaction fee for every point rewarded and then bears its own costs for accepting reward points as partial payment. For example, a merchant may pay a small fee, such as two cents, for every point it rewards. The redeeming merchant may decide how much each point is worth, such as, for example, a $0.20 discount, and may simply bear the cost of this discount. Alternatively, the process 1800 can be implemented such that each participating merchant pays an up-front fee of, for example, $0.25 per point, and a large percentage of such fee, such as $0.20 per point, is paid to the merchant that accepts a redeemed point. This approach has the advantage of allowing merchants to recoup a large portion of the cost of participation in the process 1800, so long as consumers redeem points at a particular merchant at roughly the same rate that they receive them from that merchant.

In another payment model, merchants may pay nothing, or a very small fee, for rewarding points, but may bear their own costs plus a transaction fee when points are redeemed. In this model, a merchant may reward 20 points, and the user may redeem the 20 points at a second merchant. In such a case, the first merchant may pay nothing or very little, while the second merchant may bear the full cost of the reward plus a transaction fee. The second merchant, for example, may pay a transaction fee of two cents per point redeemed. This model has the advantage of requiring the primary beneficiaries of the advertising, those with whom users ultimately conduct business, to bear most of the cost. However, this model has the disadvantage that the entity coordinating the process 1800 is not compensated for advertisements if the user does not follow through and redeem his reward points. Further, this model encourages advertisers to reward as many points as possible (to cause consumers to view their advertisements) while offering the least possible reward for point redemption. Accordingly, it is preferable to require advertisers to pay at least a small amount for having advertisements displayed and for granting rewards in order to discourage strategic behavior at the expense of the entity coordinating the process 1800.

In a state 1825, the process 1800 processes reward redemption. This state 1825 may occur when a user goes to a website or webpage dedicated to reward redemption. Alternatively or additionally, an opportunity to redeem rewards may be presented to a user at the end of an advertisement in which a user has completed certain tasks and has received rewards. Alternatively or additionally, various merchants participating in the process 1800 may provide mechanisms for redeeming points. For example, a merchant website may include a button that the user can click to indicate that the user wants to redeem reward points, or the merchant website may be configured to detect when the user has reward program software installed on his computer and may automatically present the option to redeem reward points when such software is detected.

As will be appreciated by a skilled artisan in light of this disclosure, the various states of the process 1800 can be performed in many different orders. For example, the state 1820 of processing payment may occur at many different times or at multiple times. Cue association fees may be assessed roughly at the same time as the state 1805 of receiving tag associations. Fees for rewarding points may be prepaid or may be assessed at the time points are actually rewarded. Likewise, fees for displaying particular task cues and the associated advertisements may be prepaid or paid at the time the advertisements are displayed. Fees for redeeming rewards may also be prepaid or assessed at the time points are redeemed. In view of this great flexibility, it will be appreciated that the order of the states as presented in the flowchart of the process 1800 does not limit the process 1800 to any particular order. The states can be performed in any order suitable to the needs of a given system.

Since the system described herein effectively decouples—both spatially and temporally—advertisement data from the content, products or services that data serves to sponsor or reduce the cost thereof, users are given the freedom of sponsoring or reducing the cost of content, products or services offered by vendors not only online but offline or in-person as well. An example of a process for executing a transaction in-person according to some embodiments is described below.

According to this embodiment, an end-user of the described system has established an account stored on service 450 by user database 762. The end-user, 'John'—as referenced in FIG. 8—has accrued 30 points in his account by viewing advertisement data and completing tasks related to that data. 'John' goes to a local vendor or merchant, such as his local Starbucks® coffee house and chooses to purchase a beverage. John presents the cashier with a unique identifier to service 450, stored on a medium such as a magnetic stripe card. In other embodiments, the unique identifier is electronically stored and processed, such as on a mobile phone device, a smart card, a personal digital assistant, a device capable of Bluetooth communication, or the like. A skilled artisan will appreciate, in light of this disclosure, that an end-user may be uniquely identified in any number of ways and the aforementioned examples are not exhaustive and should not be limiting. During the transaction, the unique identifier is processed and a message containing transaction data is sent over network 430 to service 450. Such data may include items of detail such as a product identifier, the cost of said product, the user ID, the user name, the account value, the date and time of purchase, a transaction identification number, or the like. In other embodiments, different transaction data may be sent over network 430 to service 450. A skilled artisan will appreciate, in light of this disclosure, that some of the illustrated information may be omitted and that other information may be sent to service 450 during the transaction.

Once transaction data reaches service 450, the verification module 756 accesses user database 762 and uniquely identifies and verifies 'John' as a legitimate user with 30 points in his account. Transaction processor 758 of service 450 then processes said transaction data and determines the amount of points 'John' can exchange in his account for a discount on the beverage. End-user 'John' may exchange all or a portion of the 30 points in his account to reduce the cost of the product or beverage by an amount related to the economic value of the points in his account—an economic value based upon a programmed algorithm that weighs factors associated with the end-user, local merchant or vendor, content providers 490, service 450 and previous agreements reached by any combinatorial permutation of the involved parties. For example, end-user 'John' may exchange 15 of his 30 points with each point bearing an economic value of $0.20, thereby reducing the cost of the product—said beverage—by $3.00. In instances where the determined discount equals the manufacturer's suggested retail price (MSRP) of the product in transaction—such as a cup of coffee with an MSRP of $3.00—end-users will have benefited by exchanging points for products while incurring no additional cost. In cases where the determined discount is less than the MSRP of the product, end-users will incur an additional cost while still achieving a discounted price. Participating vendors and merchants benefit by attracting more customers and at least in one embodiment of the described system, increasing sales by offering discounts while recouping the discounted costs from service 450.

11. Conclusion

The foregoing embodiments have been described by way of example and not limitation. A skilled artisan will appreciate, in light of this disclosure, how to implement the embodiments described herein, variations of the embodiments described herein, and other alternative embodiments not explicitly described. For example, the embodiments described herein can be modified by omitting one or more of the features described herein, without departing from the invention. Additionally, features from different embodiments can be combined without departing from the invention. All embodiments that are understood by a skilled artisan in light of this disclosure, and all substantial and/or reasonable equivalents thereto, whether or not they are explicitly described herein, are within the scope of the invention.

What is claimed is:

1. A computer-based method comprising:
   accessing a first computer program that comprises computer-executable instructions stored in at least one computer-readable medium; and
   executing the first computer program on at least one computer processor, thereby causing computer hardware to perform operations comprising:
   receiving third party content;
   determining user interest in at least one subject matter;
   identifying a tag associated with the third party content; and
   accessing a database comprising tags, task cues, and scores, each score being associated with a respective tag;
   selecting a task cue based upon the tag and associated score;
   upon user selection of the task cue, updating a balance of reward points within a reward account of the user, wherein updating the reward account of the user comprises:
      accessing a user database comprising a feedback score associated with the user, wherein the feedback score is based upon a ratio of a number of reward points used by the user to a number of purchases made by the user;
      determining, based upon the user selected task cue and the feedback score associated with the user, an amount of earned points that can be earned upon completion of a task associated with the task cue;
      determining that the user has completed the task associated with the task cue; and
      increasing the balance of reward points within the reward account of the user.

2. The method of claim 1, wherein identifying the tag comprises locating at least a portion of a text string.

3. The method of claim 1, wherein identifying the tag comprises locating at least a portion of an image.

4. The method of claim 1, further comprising displaying the task cue.

5. The method of claim 1, wherein updating the reward account further comprises determining a quantity of task cues selected by the user.

6. The method of claim 1, further comprising offering a reward to the user based at least in part upon a value associated with the reward account.

7. The method of claim 6, further comprising updating the reward account upon user acceptance of the offered reward.

8. A tangible non-transitory computer-readable medium that has, physically encoded thereon, a first computer program comprising computer-executable instructions that, when loaded into computer hardware, transforms the computer hardware into a machine comprising a plurality of circuits that collectively operate, under the direction of the computer-executable instructions, to:
   identify data related to an occurrence of an event by a user;
   identify, based at least in part upon the occurrence of the event by the user, a task of interest;
   access a database comprising tags and task cues to identify a tag using the data related to the occurrence of the event, the database further comprising scores, each score being associated with a respective tag;
   select a task cue based upon the identified tag and associated score;
   execute the task associated with the task cue;
   access a user database comprising a feedback score associated with the user, wherein the feedback score is based upon a ratio of a number of reward points used by the user to a number of purchases made by the user;

determine, based upon the task cue and the feedback score associated with the user, an amount of earned points that can be earned upon completion of the task associated with the task cue;

determine that the user has completed the task associated with the task cue;

increase a balance of reward points within a reward account of the user;

transmit second reward data responsive to a purchase transaction of the user;

offer a reward to the user based at least in part on the second reward data; and generate third reward data to update the reward account when the user accepts the offered reward.

9. The tangible non-transitory computer-readable medium of claim 8, wherein the instructions configured to identify data related to an occurrence of an event are part of a proxy browser application configured to interpret data to be displayed in an internet browser application.

10. The tangible non-transitory computer-readable medium of claim 8, wherein the instructions configured to identify data related to an occurrence of an event are part of a pattern recognition application.

11. The tangible non-transitory computer-readable medium of claim 8, wherein the instructions are further configured such that the task cue is displayed at a predetermined location.

12. The tangible non-transitory computer-readable medium of claim 8, wherein the task cue is configured to encourage viewing and responding to visual stimuli.

13. The tangible non-transitory computer-readable medium of claim 8, wherein the task comprises downloading an object.

14. The tangible non-transitory computer-readable medium of claim 8, wherein the data related to the occurrence of an event is related to an inquiry, wherein the task cue comprises information related to the inquiry, and wherein the executed task corresponds to opening a communications channel in order to resolve the inquiry.

15. The tangible non-transitory computer-readable medium of claim 8, wherein the event corresponds to an attempt to access content.

16. The tangible non-transitory computer-readable medium of claim 15, wherein the content comprises a media file.

17. The tangible non-transitory computer-readable medium of claim 15, wherein the content comprises a software application.

18. The tangible non-transitory computer-readable medium of claim 15, wherein the reward comprises access privileges for the content.

* * * * *